May 19, 1953 J. E. OSTLINE 2,639,331

AUTOMATIC TELEPHONE SYSTEM

Filed March 11, 1947 9 Sheets-Sheet 1

INVENTOR.
John E. Ostline

BY

Davis, Lindsey, Smith & Shonts

Attorneys

INVENTOR.
John E. Ostline

BY

Davis, Lindsey, Smith & Shonts
Attorneys

May 19, 1953 J. E. OSTLINE 2,639,331

AUTOMATIC TELEPHONE SYSTEM

Filed March 11, 1947 9 Sheets-Sheet 3

INVENTOR.
John E. Ostline

BY

Davis, Lindsey, Smith & Shonts

Attorneys

Inventor
John E. Ostline
By
Davis, Lindsey, Smith & Shonts
Attorneys

Inventor
John E. Ostline
By
Davis, Lindsey, Smith & Shonts
Attorneys

Inventor
John E. Ostline
By
Davis, Lindsey, Smith & Shonts
Attorneys

Inventor
John E. Ostline
By
Davis, Lindsey, Smith & Shoots
Attorneys

May 19, 1953 J. E. OSTLINE 2,639,331

AUTOMATIC TELEPHONE SYSTEM

Filed March 11, 1947 9 Sheets-Sheet 8

INVENTOR.
John E. Ostline

BY
Davis, Lindsey, Smith & Shonts
Attorneys

AUTOMATIC TELEPHONE SYSTEM

Filed March 11, 1947 9 Sheets-Sheet 9

Inventor
John E. Ostline
By
Davis, Lindsey, Smith & Shonts
Attorneys

Patented May 19, 1953 2,639,331

UNITED STATES PATENT OFFICE 2,639,331

AUTOMATIC TELEPHONE SYSTEM

John E. Ostline, Chicago, Ill., assignor to Automatic Electric Laboratories, Inc., Chicago, Ill., a corporation of Delaware Application March 11, 1947, Serial No. 733,915

21 Claims. (Cl. 179—18)

The present invention relates to automatic telephone systems and, more particularly, to improved automatic switching apparatus for setting up telephone connections.

It is an object of the present invention to provide a telephone system in which connections may be set up by automatic switching apparatus to telephone lines employing directory numbers corresponding to the line terminals, wherein each individual automatic switch utilized comprises register mechanism that does not require releasing and resetting between successive signals received thereby in order to control successive coordinate operations of the switch.

Another object of the invention is to provide an automatic switch that comprises improved register mechanism which may be operated in accordance with a first signal received directly from its home position to a first position in order to bring about a first operation of the switch corresponding to the first signal received, and then operated in accordance with a second signal inclined directly from its first position to a second position in order to bring about a second operation of the switch corresponding to the second signal received.

Another object of the invention is to provide in an automatic telephone system a finder incorporating an automatic switch of the character described.

Another object of the invention is to provide in an automatic telephone system a selector incorporating an automatic switch of the character described.

Another object of the invention is to provide in an automatic telephone system a connector incorporating an automatic switch of the character described.

A further object of the invention is to provide an automatic switch of improved construction and arrangement that comprises a plurality of members and a plurality of contact sets and a plurality of selecting magnets respectively associated with the members and with the contact sets, whereby each selecting magnet is operative simultaneously to select the corresponding member and to operate the corresponding contact set.

A further object of the invention is to provide in an automatic switch of the coordinate type, improved clutch-control mechanism common to the bars and to the contact sets, whereby, when any bar is clutched to the associated operating element, the corresponding contact set is operated.

Further features of the invention pertain to the particular arrangement of the circuit elements of the system, whereby the above-outlined and additional operating features thereof are attained.

Figure 1:
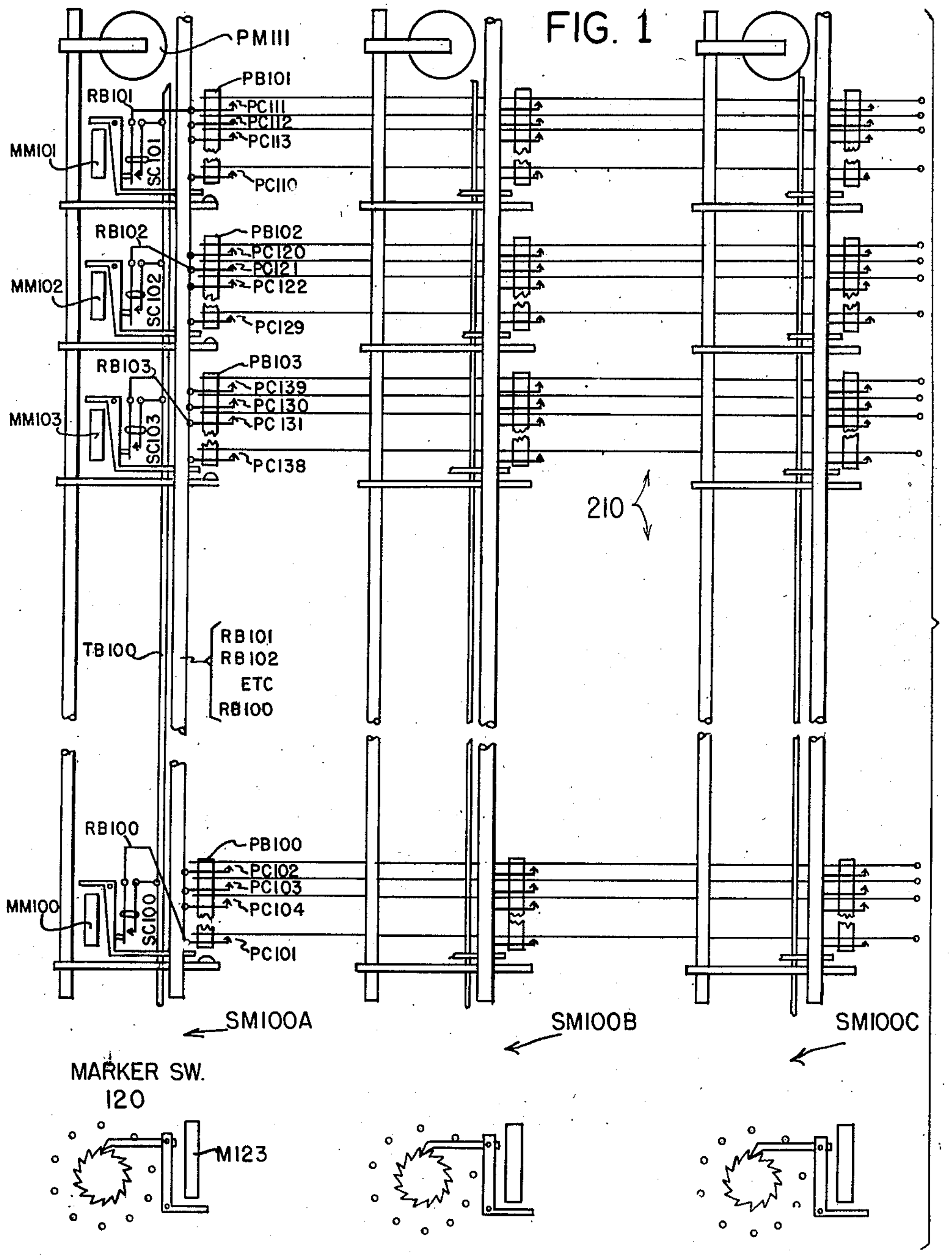
Figures 2, 3:
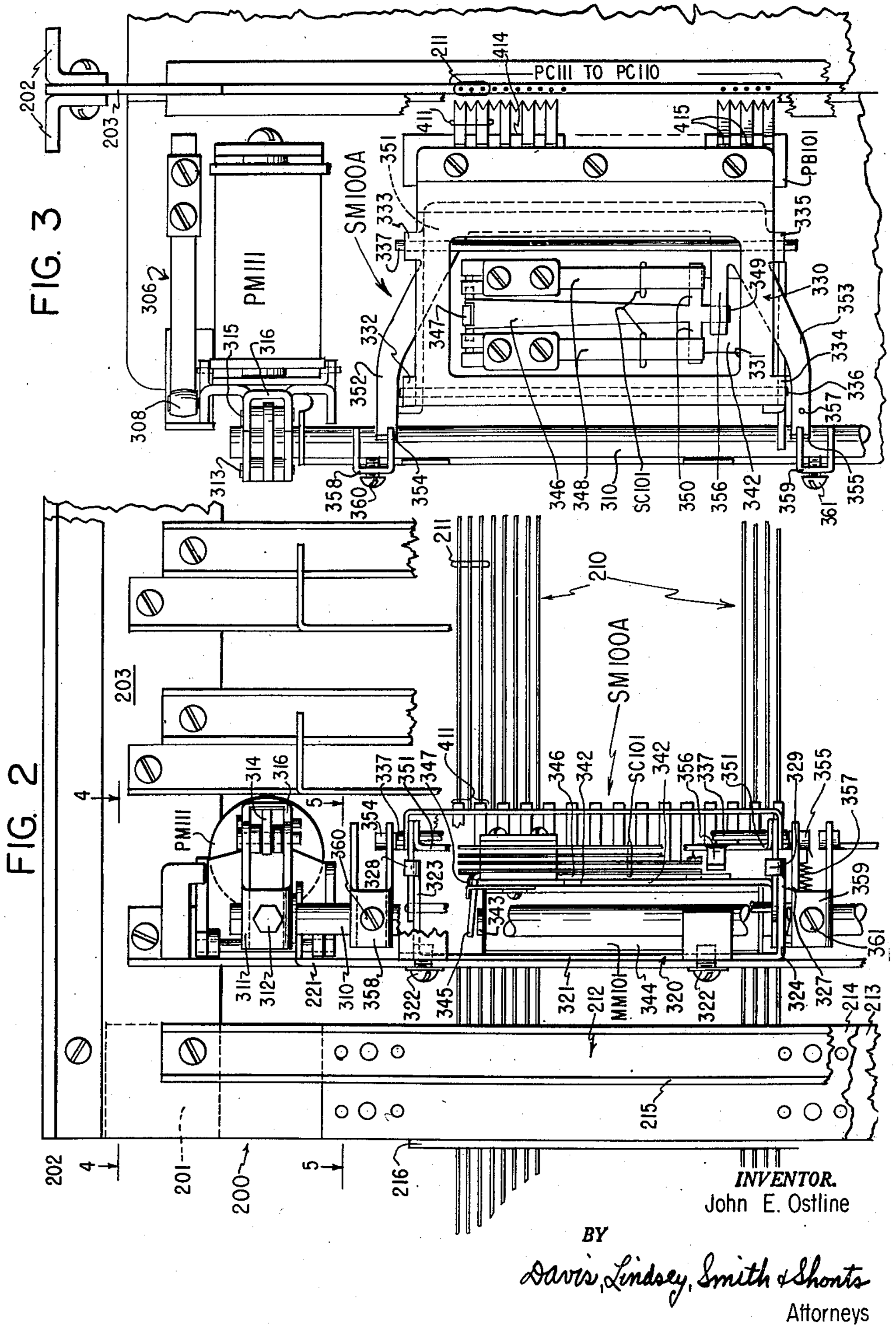
Figure 5:
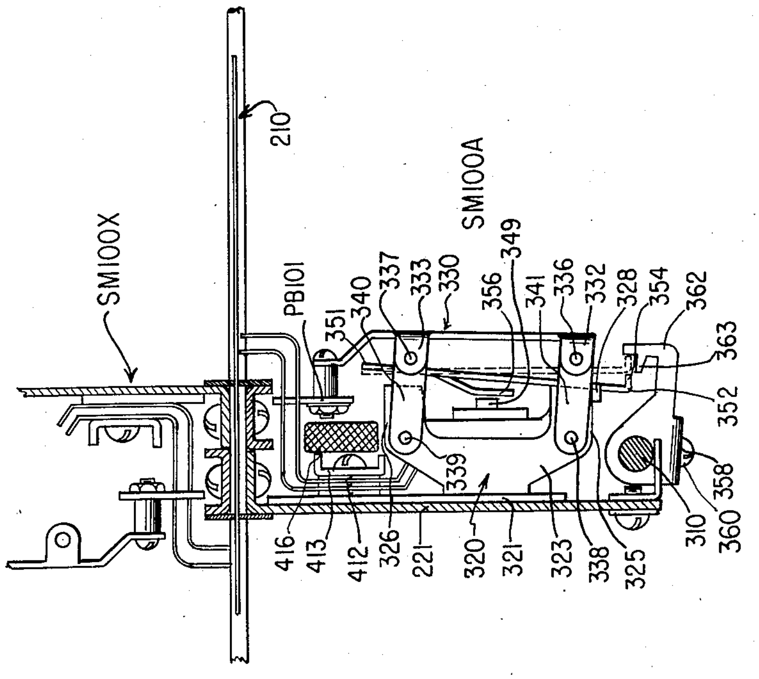
Figure 4:
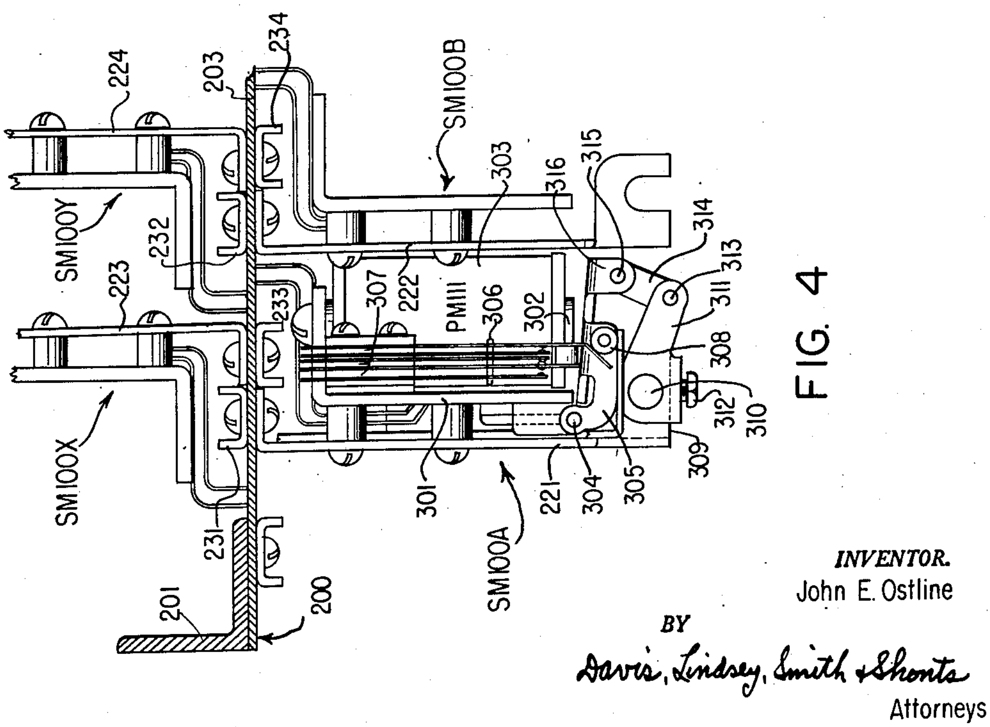
Figure 10:
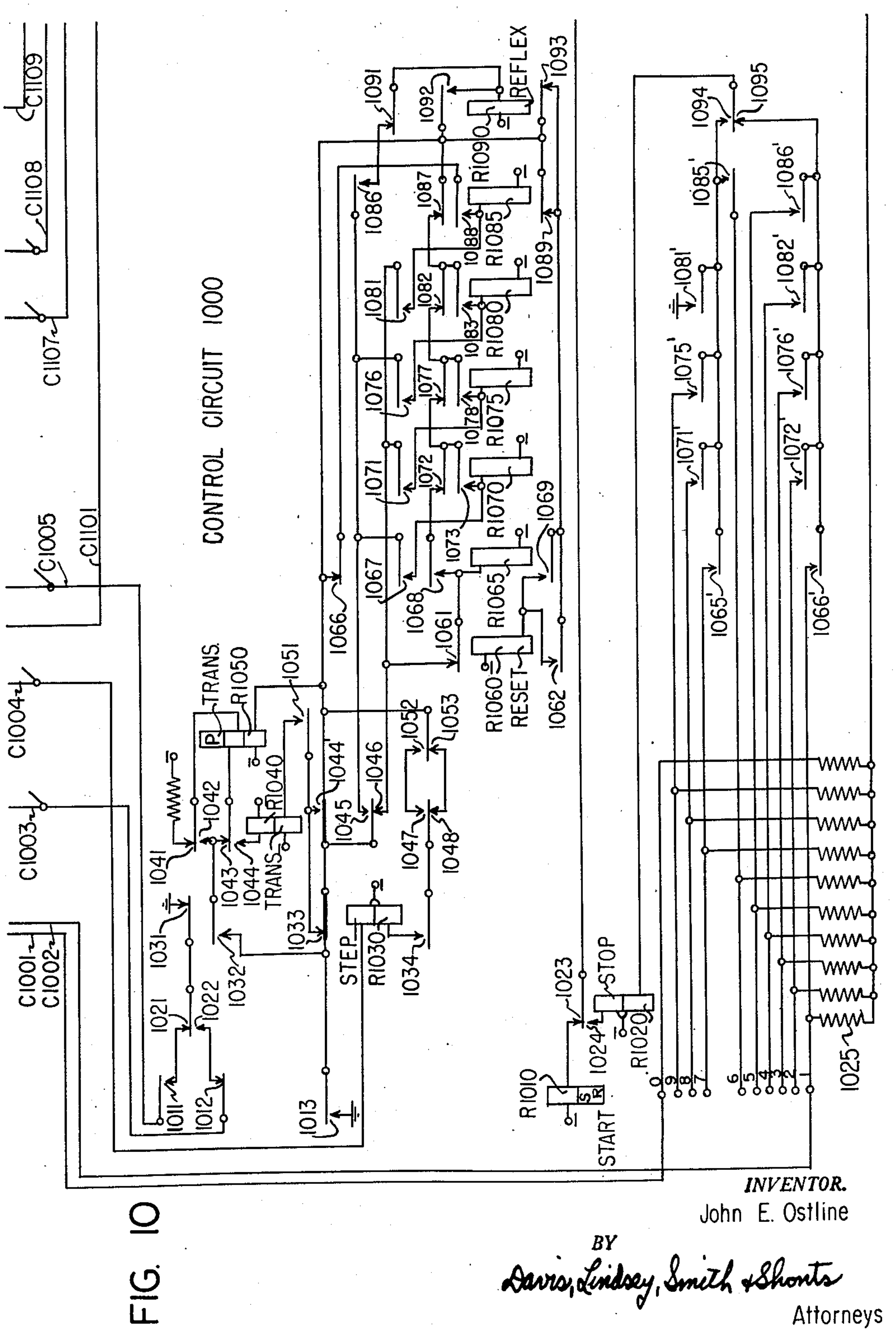
Figure 11:
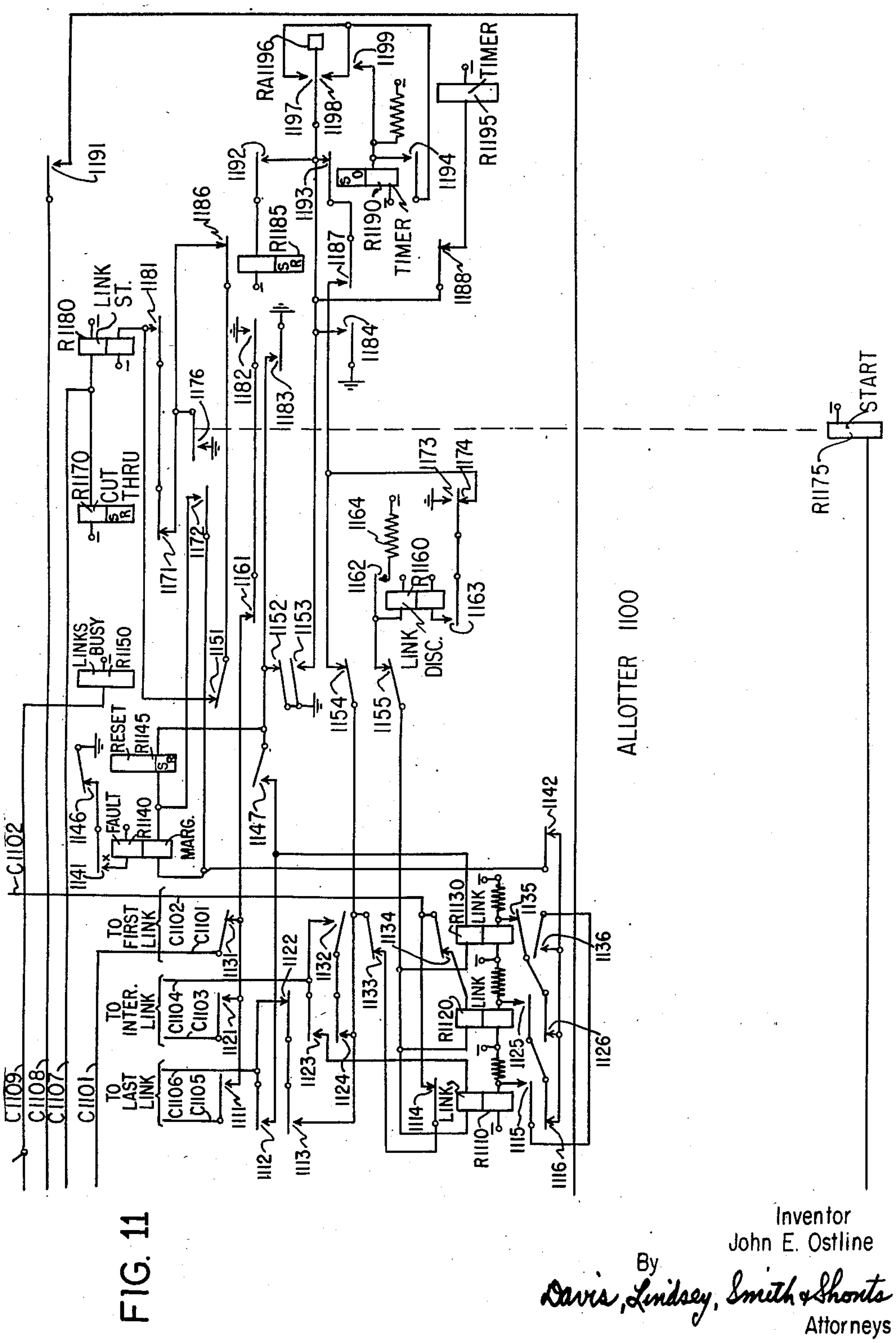

The invention, both as to its organization and method of operation, together with further objects and advantages thereof, will best be understood by reference to the following specification taken in connection with the accompanying drawings, in which Figure 1 is a fragmentary schematic front elevational view of switching apparatus, as well as a one-line schematic wiring diagram therefor, constructed and arranged in accordance with the present invention; Fig. 2 is an enlarged fragmentary front elevational view of the upper left-hand portion of the switching apparatus shown in Fig. 1, illustrating the structural details of this portion of the switching apparatus and particularly the details of the first switch mechanism incorporated therein; Fig. 3 is an enlarged fragmentary side elevational view of the upper left-hand portion of the first switch mechanism shown in Fig. 2, together with the associated portion of the supporting structure for the switching apparatus; Fig. 4 is an enlarged fragmentary sectional view, taken along the line 4—4 in Fig. 2, of the switching apparatus, illustrating additional structural details of the upper portion of the first switch mechanism shown in Figs. 2 and 3; Fig. 5 is an enlarged fragmentary sectional view, taken along the line 5—5 in Fig. 2, of the switching apparatus, illustrating additional structural details of the upper portion of the first switch mechanism shown in Figs. 2, 3 and 4; and Figs. 6 to 11, inclusive, taken together illustrate the details of a complete automatic telephone system and incorporated therein switching apparatus of the character of that shown in Figs. 1 to 5, inclusive. More particularly, Figs. 6, 7, 8 and 9 should be arranged from left to right in end-to-end relation; and Figs. 10 and 11 should be arranged from left to right in end-to-end relation and disposed, respectively, below Figs. 6 and 7 in order to form a unified diagram.

Figure 6:
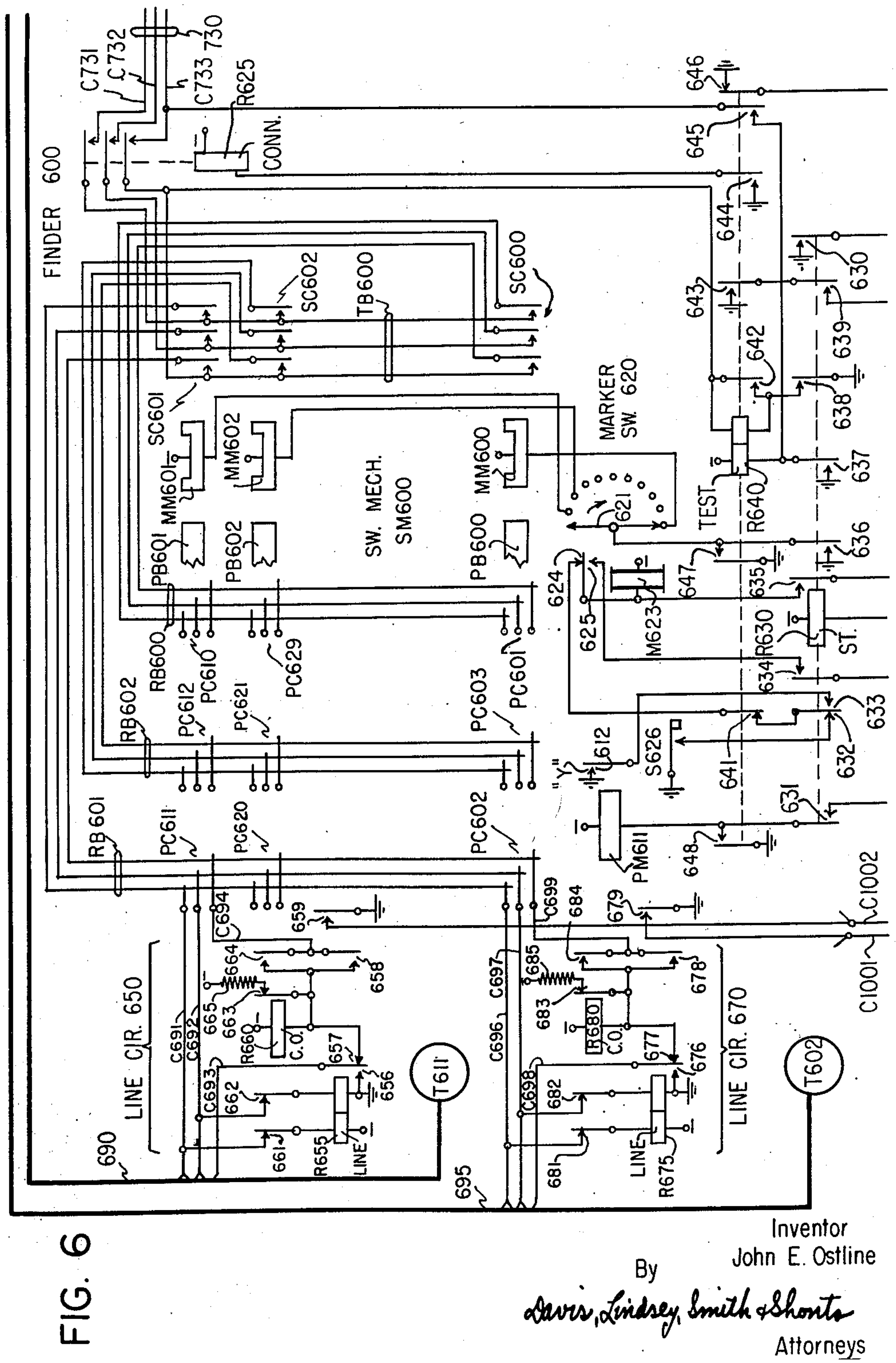

Referring now, more particularly, to Figs. 6 to 11, inclusive, of the drawings, there is illustrated an automatic telephone system comprising an exchange terminating 1,000 subscriber lines, including the subscriber lines 690 and 695 respectively extending to subscriber substations T611 and T602. Each subscriber line is provided with a line circuit individual thereto; the line circuits 650 and 670 being respectively individual to the subscriber lines 690 and 695, as shown in Fig. 6. Also, the system comprises switching apparatus, including ten groups of finder-selector links; the second group including the first finder-selector link illustrated, which comprises the finder 600, shown in Fig. 6, and the selector 700, shown in Fig. 7. Also, the switching apparatus comprises ten groups of connectors, each including ten individual connectors; the ninth individual connector 800 in the second group being shown in Figs. 8 and 9. Moreover, the system comprises a control circuit and an allotter individual to each group of finder-selector links; the control circuit 1000 and the allotter 1100, respectively shown in Figs. 10 and 11, being individually associated with the second group of finder-selector links, including the first link illustrated. Each group of finder-selector links serves a corresponding group of 100 of the subscriber lines; and each group of connectors serves a corresponding group of 100 of the subscriber lines. Specifically, the second group of finder-selector links, including the first link illustrated, serves the second 100 line group of subscriber lines; and the second group of connectors, including the ninth connector 800 illustrated, serves the second group of 100 subscriber lines.

Preferably, the line circuits are identical; the line circuits 650 and 670 respectively comprising, as shown in Fig. 6, line relays R655 and R675, and cut-off relays R660 and R680; and are connected and arranged in a manner more fully explained hereinafter.

Preferably, each of the links is identical to that illustrated, comprising the finder 600 and the selector 700. The finder 600, shown in Fig. 6, comprises a switch mechanism SM600; and a relay group including a start relay R630, a test relay R640 and a connect relay R625; as well as a selecting device or marker switch 620 of the forward-stepping rotary type; and is connected and arranged in a manner more fully explained hereinafter. The switch mechanism SM600 is identical to that shown in Figs. 1 to 5, inclusive, and described hereinafter; and comprising, among other elements, ten marking magnets MM601 to MM600, inclusive; ten primary members or bars PB601 to PB600, inclusive; a primary magnet PM611; one hundred primary contact sets PC611 to PC600, inclusive; and ten secondary contact sets SC601 to SC600, inclusive.

More particularly, in the switch mechanism SM600 the ten secondary contact sets SC601 to SC600, inclusive, are respectively associated with the ten marking magnets MM601 to MM600, inclusive; whereas the one hundred primary contact sets PC611 to PC600, inclusive, are associated with the ten primary bars PB601 to PB600, inclusive, in the manner indicated below.

| Primary Bars | Disposition of the Primary Contact Sets (Left to Right) |
|---|---|
| PB601 | PC611, PC612, etc., and PC610. |
| PB602 | PC620, PC621, etc., and PC629. |
| PB603 | PC639, PC630, etc., and PC638. |
| PB604 | PC648, PC649, etc., and PC647. |
| PB605 | PC657, PC658, etc., and PC656. |
| PB606 | PC666, PC667, etc., and PC665. |
| PB607 | PC675, PC676, etc., and PC674. |
| PB608 | PC684, PC685, etc., and PC683. |
| PB609 | PC693, PC694, etc., and PC692. |
| PB600 | PC602, PC603, etc., and PC601. |

Finally, the switch mechanism SM600 comprises ten riser busses RB601 to RB600, inclusive, respectively terminating in the ten secondary contact sets SC601 to SC600, inclusive. Further, each of the ten riser busses RB601 to RB600, inclusive, terminates in ten of the primary contact sets respectively disposed in the ten groups of primary contact sets. For examples, the riser bus RB601 terminates in the ten primary contact sets PC611, PC620, etc., and PC602; the riser bus RB602 terminates in the ten primary contact sets PC612, PC621, etc., and PC603; and the riser bus RB600 terminates in the ten primary contact sets PC610, PC629, etc., and PC601.

In the finder 600, the marker switch 620 is of the forward-stepping rotary type, as previously noted, and comprises a double-ended wiper 621 provided with an associated contact bank, including ten individual contacts; and a magnet M623 for driving the wiper noted step by step in the clockwise direction. Also, associated with the marker switch 620 is a set of switch springs S626, which is actuated when the wiper noted is driven away from its home position, wherein it engages the tenth contact in the associated contact bank.

Figure 7:
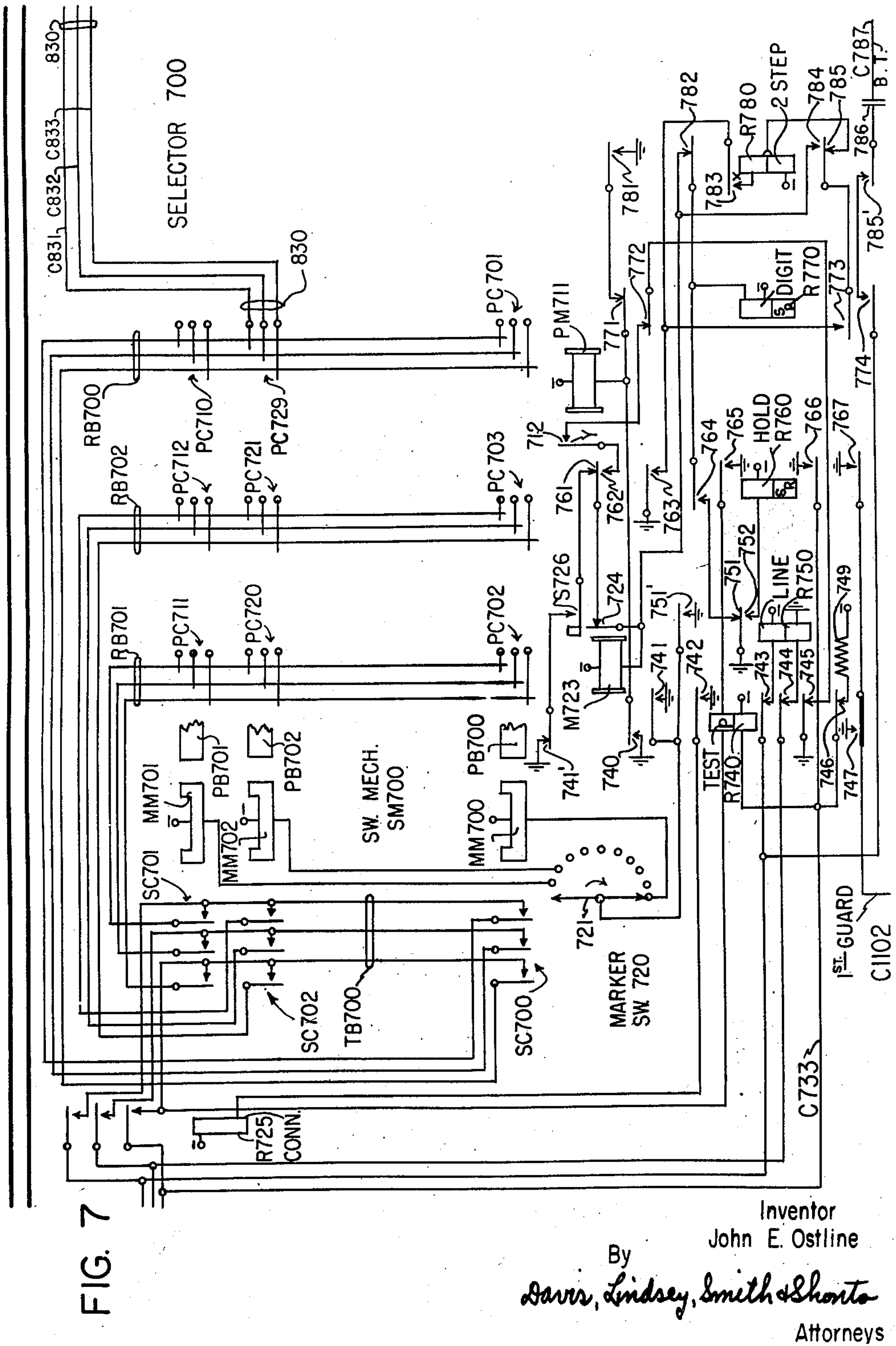

The selector 700, shown in Fig. 7, comprises a switch mechanism SM700; and a relay group including a test relay R740, a line relay R750, a hold relay R760, a digit relay R770, a control relay R780; and a connect relay R725; as well as a selecting device or marker switch 720 of the forward-stepping rotary type; and is connected and arranged in a manner more fully explained hereinafter. The switch mechanism SM700 is substantially identical to that shown in Figs. 1 to 5, inclusive, and described hereinafter; and comprises, among other elements, ten marking magnets MM701 to MM700, inclusive; ten primary members or bars PB701 to PB700, inclusive; a primary magnet PM711; one hundred primary contact sets PC711 to PC700, inclusive; and ten secondary contact sets SC701 to SC700, inclusive.

More particularly, in the switch mechanism SM700, the ten secondary contact sets SC701 to SC700, inclusive, are respectively associated with the ten marking magnets MM701 to MM700, inclusive; whereas, the one hundred primary contact sets PC711 to PC700, inclusive, are associated with the ten primary bars PB701 to PB700, inclusive, in the manner indicated below:

| Primary Bars | Disposition of the Primary Contact Sets (Left to Right) |
|---|---|
| PB701 | PC711, PC712, etc., and PC710. |
| PB702 | PC720, PC721, etc., and PC729. |
| PB703 | PC739, PC730, etc., and PC738. |
| PB704 | PC748, PC749, etc., and PC747. |
| PB705 | PC757, PC758, etc., and PC756. |
| PB706 | PC766, PC767, etc., and PC765. |
| PB707 | PC775, PC776, etc., and PC774. |
| PB708 | PC784, PC785, etc., and PC783. |
| PB709 | PC793, PC794, etc., and PC792. |
| PB700 | PC702, PC703, etc., and PC701. |

Finally, the switch mechanism SM700 comprises ten riser busses RB701 to RB700, inclusive, respectively terminating in the ten secondary contact sets SC701 to SC700, inclusive. Further, each of the ten riser busses RB701 to RB700, inclusive, terminates in ten of the primary contact sets respectively disposed in the ten groups of primary contact sets. For examples, the riser bus RB701 terminates in the ten primary contact sets PC711, PC720, etc., and PC702; the riser bus RB702 terminates in the ten primary contact sets PC712, PC721, etc., and PC703; and the riser bus RB700 terminates in the ten pimary sets PC710, PC729, etc., and PC701.

In the finder 700, the marker switch 720 is of the forward-stepping rotary type, as previously noted, and comprises a double-ended wiper 721 provided with an associated contact bank, including ten individual contacts; and a magnet M723 for driving the wiper noted step by step in the clockwise direction. Also, associated with the marker switch 720 is a set of switch springs S726, which is actuated when the wiper noted is driven away from its home position, wherein it engages the tenth contact in the associated contact bank.

Figure 8:
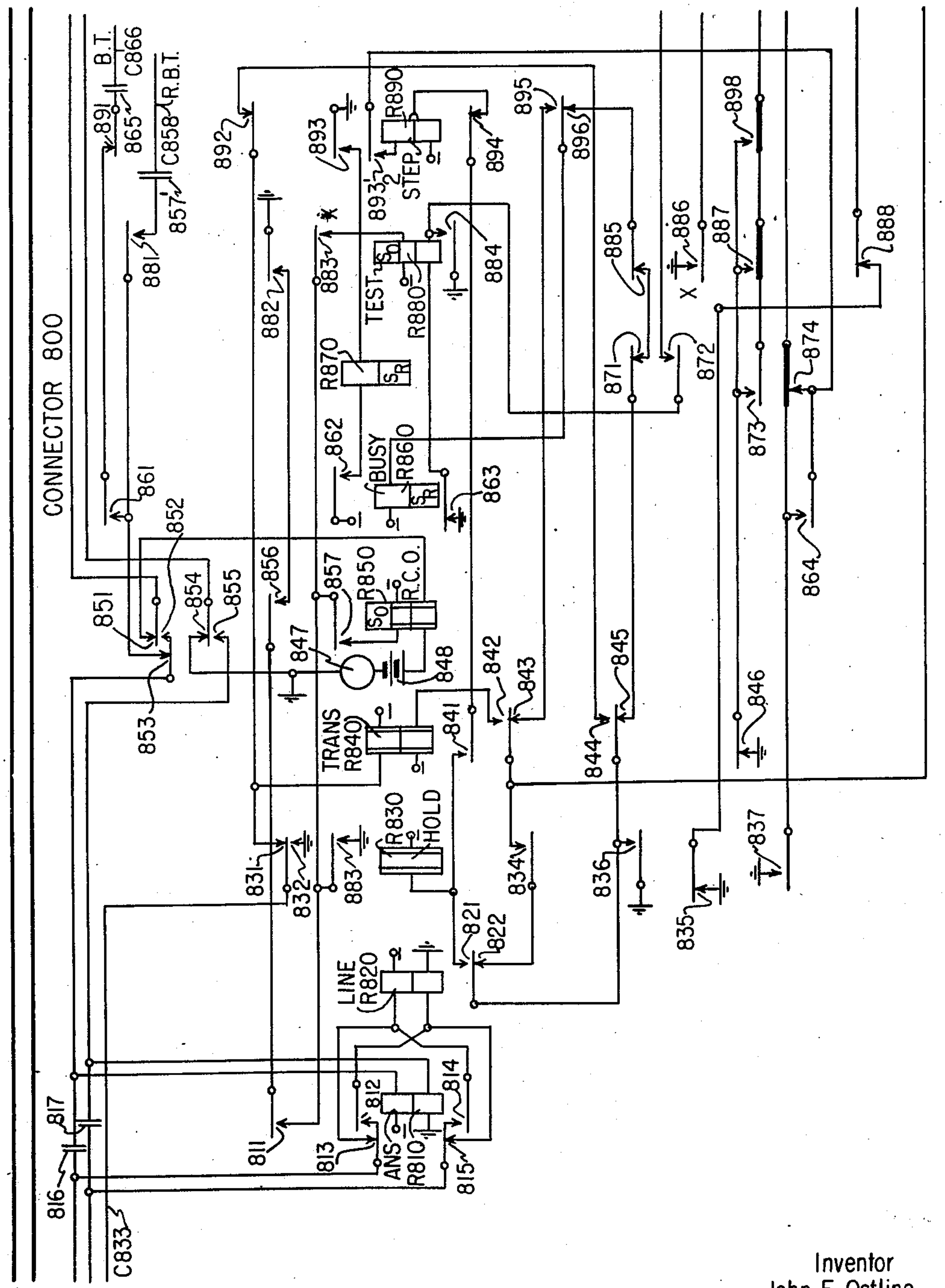
Figure 9:
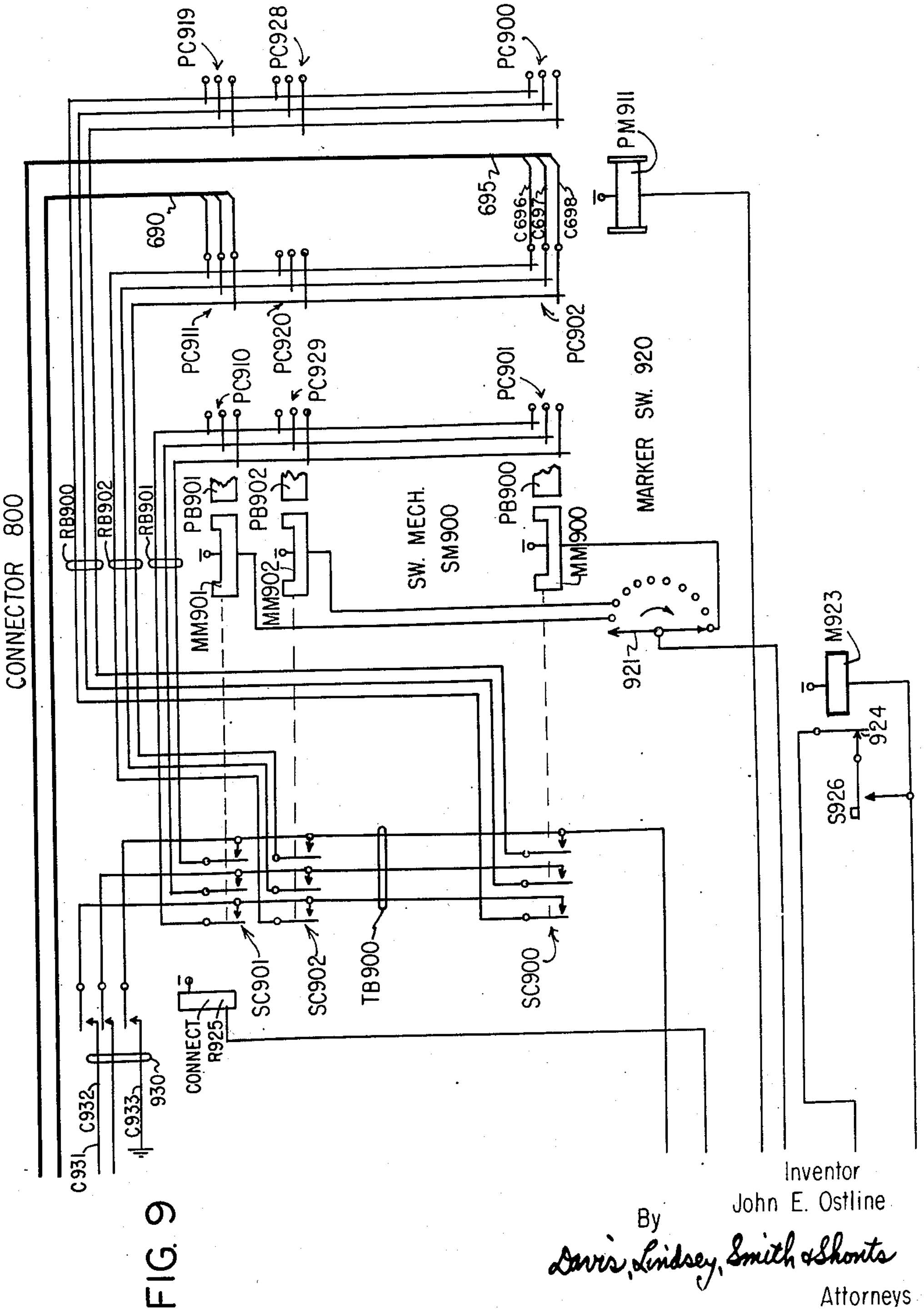

Preferably, each of the connectors is identical to the connector 800, shown in Figs. 8 and 9, that comprises a switch mechanism SM900; and a relay group including an answer relay R810, a line relay R820, a hold relay R830, a transfer relay R840, a ring cut-off relay R850, a busy relay R860, a test relay R880, two control relays R870 and R890 and a connect relay R925; as well as a selecting device or marker switch 920 of the forward-stepping rotary type; and is connected and arranged in a manner more fully explained hereinafter. The switch mechanism SM900 is substantially identical to that shown in Figs. 1 to 5, inclusive, and described hereinafter; and comprises, among other elements, ten marking magnets MM901 to MM900, inclusive; ten primary members or bars PB901 to PB900; inclusive, a primary magnet PM911; one hundred primary contact sets PC911 to PC900, inclusive; and ten secondary contact sets SC901 to SC900, inclusive.

More particularly, in the switch mechanism SM900, the ten secondary contact sets SC901 to SC900, inclusive, are respectively associated with the ten marking magnets MM901 to MM900, inclusive; whereas the one hundred primary contact sets PC911 to PC900, inclusive, are associated with the ten primary bars PB901 to PB900, inclusive, in the manner indicated below:

| Primary Bars | Disposition of the Primary Contact Sets (Left to Right) |
|---|---|
| PB901 | PC910, PC911, etc., and PC919. |
| PB902 | PC929, PC920, etc., and PC928. |
| PB903 | PC938, PC939, etc., and PC937. |
| PB904 | PC947, PC948, etc., and PC946. |
| PB905 | PC956, PC957, etc., and PC955. |
| PB906 | PC965, PC966, etc., and PC964. |
| PB907 | PC974, PC975, etc., and PC973. |
| PB908 | PC983, PC984, etc., and PC982. |
| PB909 | PC992, PC993, etc., and PC991. |
| PB900 | PC901, PC902, etc., and PC900. |

Finally, the switch mechanism SM900 comprises ten riser busses, RB901 to RB900, inclusive, respectively terminating in the ten secondary contact sets SC901 to SC900, inclusive. Further, each of the ten riser busses RB901 to RB900, inclusive, terminates in the ten primary contact sets respectively disposed in the two groups of primary contact sets. For examples, the riser bus RB901 terminates in the ten primary contact sets PC910, PC928, etc., and PC901; the riser bus RB902 terminates in the ten primary contact sets PC911, PC920, etc., and PC902; and the riser bus RB900 terminates in the ten primary contact sets PC919, PC928, etc., and PC900.

In the connector 800, the marker switch 920 is of the forward-stepping rotary type, as previously noted, and comprises a double-ended wiper 921 provided with an associated contact bank, including ten individual contacts; and a magnet M923 for driving the wiper noted step by step in the clockwise direction. Also, associated with the marker switch 920, is a set of switch springs S926, which is actuated when the wiper noted is driven away from its home position, wherein it engages the tenth contact in the associated contact bank.

The control circuit 1000 is commonly associated with the finder-selector links in the second group and comprises a relay group including a start relay R1010, a stop relay R1020, a step relay R1030, two transfer relays R1040 and R1050, a reset relay R1060, five counting relays R1065, R1070, R1075, R1080 and R1085, and a reflex relay R1090; and is connected and arranged in a manner more fully explained hereinafter.

The allotter 1100 is commonly associated with the finder-selector links in the second group and comprises a relay group including a plurality of link relays respectively corresponding to the finder-selector links in this group; the link relay R1130 being individual to the first finder-selector link illustrated in this group, and the link relays R1120 and R1110 being respectively individual to an intermediate link, not shown, in this group, and to the last link, not shown, in this group; a fault relay R1140; a reset relay R1145; a links-busy relay R1150; a link disconnect relay R1160; a cut-through relay R1170; a start relay R1175; a link start relay R1180; a control relay R1185; and two timer relays R1190 and R1195; all connected and arranged in a manner more fully described hereinafter.

*Structure and operation of the switching apparatus*

As previously noted, each of the finders 600, etc., the selectors 700, etc., and the connectors 800, etc., comprises a switch mechanism substantially identical to that shown in Figs. 1 to 5, inclusive. Referring now, more particularly, to Figs. 1 to 5, inclusive, the switching apparatus there illustrated comprises a supporting frame 200 including a plurality of spaced-apart, upstanding angle members 201 and a plurality of horizontally extending angle members 202 rigidly secured together to form an upstanding, horizontally extending structure. Also, the supporting frame 200 includes a horizontally extending top rail 203, and a horizontally extending bottom rail, not shown, secured to the angle members 201. Further, the supporting frame 200 carries a horizontally extending bare-wire bank 210 including 100 conductor sets; each individual conductor set comprising, at least, three individual conductors, including a positive line conductor, a negative line conductor and a control conductor; one of the conductor sets being indicated at 211.

The opposite ends of the bare-wire bank 210, as well as spaced-apart intermediate portions thereof are suitably supported by upstanding insulating clamps; the insulating clamps disposed at the left-hand end of the bare-wire bank 210 being indicated at 212. The insulating clamp 212 comprises two upstanding strips of insulating material 213 and 214 between which the individual conductors in the conductor sets 211, etc., are retained in place in spaced-apart relation, as well as an upstanding channel 215 secured to the angle member 201 in order to retain the insulating strips 213 and 214 in clamped relation. Also, the particular insulating clamp 212 disposed at the left-hand end of the bare-wire bank 210 is provided wtih a strip of insulating material 216 through which the individual conductors in the conductor sets 211, etc., project; whereby the insulating strip 216 constitutes a terminal strip. The ends of the individual conductors in the conductor sets 211, etc., project slightly beyond and to the left of the terminal strip 216 and provide terminals, whereby the individual conductor sets may terminate 100 subscriber lines.

The supporting frame 200 carries a plurality of vertically extending and horizontally spaced-apart switch mechanisms, SM100A, SM100B, SM100C, etc., on the front side thereof, as well as a plurality of vertically extending and horizontally spaced-apart switch mechanisms SM100X, SM100Y, etc., on the rear side thereof, as best illustrated in Fig. 4. The individual switch mechanisms SM100A, SM100B, etc., disposed on the front of the supporting frame 200 and the individual switch mechanisms SM100X, SM100Y, etc., disposed on the rear of the supporting frame 200 are arranged in staggered relation; whereby a switch mechanism on the front of the supporting frame 200 and a switch mechanism on the rear of the supporting frame 200 have common access to the opposite sides of an intermediate section of the bare-wire bank 210. Each individual switch mechanism SM100A, etc., is provided with an upstanding and outwardly projecting supporting base, which is secured to the top rail 203 and to the bottom rail, not shown, of the supporting frame 200 by an arrangement including a channel disposed on the opposite side of the top rail 203 and the bottom rail, not shown. For example, the switch mechanisms SM100A and SM100B respectively comprise supporting bases 221 and 222 projecting outwardly from the front of the supporting frame 200 and securing channels 231 and 232 disposed on the rear of the supporting frame 200; while the switch mechanisms SM100X and SM100Y respectively comprise supporting bases 223 and 224 projecting outwardly from the rear of the supporting frame 200 and securing channels 233 and 234 disposed on the front of the supporting frame 200. Of course, it will be understood that the portions of the supporting bases 221, 222, 223, 224, etc., adjacent to the webs of the respective channels 231, 232, 233, 234, etc., are retained in spaced-apart relation by the top rail 203 and the bottom rail, not shown; whereby these elements are positioned out of contact with the bare-wire bank 210 in order to prevent short-circuiting of the conductor sets 211, etc.

Preferably, the individual switch mechanisms SM100A, etc., are identical; and only the switch mechanism SM100A will be described in detail. As previously noted, the switch mechanism SM100A comprises a supporting base 221, ten vertically spaced-apart marking magnets MM101, MM102, MM103, etc., and MM100; a primary magnet PM111; ten primary bars PB102, PB103, etc., and PB100; one hundred primary contact sets PC111 to PC100, inclusive; and ten secondary contact sets SC101, SC102, SC103, etc., and SC100. Also the switch mechanism SM100A comprises a marker switch 120 of the forward-stepping rotary type provided with an operating magnet M123 which marker switch 120 is carried by the supporting base 221 adjacent to the lower end thereof and to the bottom rail, not shown.

Considering now the construction of the switch mechanism SM100A in greater detail, the primary magnet PM111 comprises a heel-piece 301 secured to the supporting base 221 and carrying a core 302 supporting a winding 303. Also, the heel-piece 301 carries a pivot pin 304 supporting an armature 305 capable of movement toward and away from the core 302. Associated with the armature 305 is a set of switch springs 306 comprising a plurality of individual resilient switch springs suitably insulated from each other by a plurality of interposed strips 307 and secured to the heel-piece 301. The armature 305 carries an insulator 308 arranged in cooperative relation with respect to the switch springs 306. Also, the supporting base 221 is provided with an upper flange 309 and a lower flange, not shown, having aligned openings formed therein into which a primary operating element 310 is suitably journalled. A fixture 311 is rigidly secured to the upper end of the primary operating element 310 by a screw 312. The outer end of the fixture 311 is connected by a pivot pin 313 to a link 314; which is also connected by a pivot pin 315 to a tab 316 formed on the armature 305. The switch springs 306, due to their resiliency, act upon the insulator 308 to bias the armature 305 in the clockwise direction, as viewed in Fig. 4, away from the end of the core 302, whereby the primary operating element 310 is retained in its normal position illustrated in Fig. 4, by virtue of the connection including the link 314 between the armature 305 and the primary operating element 310.

In view of the foregoing description of the primary magnet PH111, it will be understood that when the winding 303 is energized, the core 302 attracts the armature 305 causing it to be rotated in the counterclockwise direction, as viewed in Fig. 4, against the bias of the switch springs 306; whereby the primary operating element 310 is rotated in the counterclockwise direction, as viewed in Fig. 4, by virtue of the connection including the link 314, extending between the fixture 311 and the tab 316. Subsequently, when the winding 303 is deenergized the switch springs 306 effect rotation of the armature 305 in the clockwise direction, as viewed in Fig. 4, back into its normal position by virtue of the action of the switch springs 306 upon the insulator 308 carried by the armature 305. When the armature 305 is thus returned to its normal position mentioned, the primary operating element 310 is rotated in the clockwise direction, as viewed in Fig. 4, back into its normal position by virtue of the connection including the link 314.

As previously noted, the switch mechanism SM100A comprises ten marking magnets MM101 to MM100, inclusive. The first marking magnet MM101 is supported by a bracket 320 having a flat body portion 321 secured directly to the supporting base 221 by spaced-apart screws 322. The body portion 321 of the bracket 320 terminates in upper and lower flanges 323 and 324, respectively, arranged in substantially parallel, spaced-apart relation and projecting outwardly from the body portion 321 to the right, as viewed in Figs. 2 and 5. Each of the flanges 323 and 324 is substantially Y-shaped; the upper flange 323 being provided with a front leg 325 and a rear leg 326; and the lower flange 324 being provided with a front leg 327 and a rear leg, not shown. The outer end of the front leg 325 of the upper flange 323 carries an upwardly directed stop 328; and the front leg 327 of the lower flange 324 carries an upwardly directed stop 329. The first primary bar PB101 is operatively associated with the first marking magnet MM101 and is in the form of a strip of insulating material secured to the rear edge of a bracket 330 having a central opening 331 formed therein and provided with spaced-apart front and rear upper tabs 332 and 333, and spaced-apart front and rear lower tabs 334 and 335. In the bracket 330, the upper and lower front tabs 332 and 334 are arranged in alignment with respect to each other and have aligned openings formed therein, through which an elongated pivot pin 336 projects; and the upper and lower rear tabs 333 and 335 are arranged in alignment with respect to each other and have aligned openings formed therein, through which an elongated pivot pin 337 projects. Similarly, in the bracket 320, the upper and lower front legs 325 and 327 respectively formed on the flanges 323 and 324 are arranged in alignment with respect to each other and have aligned openings formed therein, through which an elongated pivot pin 338 projects; and the upper and lower rear legs 326 and, not shown, respectively formed on the flanges 323 and 324 are arranged in alignment with respect to each other and have aligned openings formed therein, through which an elongated pivot pin 339 projects. The bracket 330 is pivotally mounted upon the bracket 320 by an arrangement comprising the four pivot pins 336, 337, 338 and 339 and four links, the upper two of which are shown at 340 and 341. More particularly, the upper rear link 340 extends between the upper ends of the pivot pins 337 and 339; the lower rear link, not shown, extends between the lower ends of the pivot pins 337 and 339; the upper front link 341 extends between the upper ends of the pivot pins 336 and 338; and a lower front link, not shown, extends between the lower ends of the pivot pins 336 and 338. Accordingly, the bracket 330 is mounted upon the bracket 320 for guided movement toward and away from the bare-wire bank 210; thereby to impart similar movements to the primary bar PB101.

The first marking magnet MM101 comprises a heel-piece 342 secured to the flange 324 of the bracket 320 and carrying a core 343 supporting a winding 344. Also, an armature 345 provided with a downwardly extending arm 346 is secured to the heel-piece 342 by an arrangement including a resilient spring 347. Further, the first secondary contact set SC101 comprises two piles of switch springs 348 secured to the heel-piece 342 and cooperating with the arm 346 carried by the armature 345. More particularly, the arm 346 terminates in a downwardly extending projection 349 and forwardly and rearwardly extending projections 350 cooperating with the switch springs 348 of the first secondary contact set SC101. Also, a fixture 351 is pivotally mounted upon the elongated pivot pin 337 and provided with upper and lower forwardly extending arms 352 and 353 respectively terminating in two operating lugs 354 and 355. Also, the fixture 351 carries a short forwardly projecting arm 356 disposed adjacent to the arm 353 and cooperating with the downwardly extending projection 349 carried on the arm 346 of the armature 345. The fixture 351 is biased in the clockwise direction, as viewed in Fig. 5, by an arrangement including a coil spring 357 extending between the arm 353 and the flange 324 carried by the bracket 320. Finally, the primary operating element 310 carries a plurality of pairs of fixtures cooperating with the arms of each fixture 351, etc. Specifically, the first pair of fixtures carried by the primary operating element 310 comprises the individual fixtures 358 and 359 respectively secured thereto by the screws 360 and 361 and cooperating with the arms 352 and 353 of the fixture 351 associated with the bracket 330 supporting the first primary bar PB101. More particularly, the fixtures 358, 359, etc., are identical; the fixture 358 terminating in a rearwardly extending arm 362 projecting toward the operating lug 354 carried on the outer end of the arm 352 of the fixture 351. Finally, the rearwardly extending arm 362 of the fixture 358 carries an operating lug 363 adapted to engage the operating lug 453 carried on the outer end of the operating arm 352 of the fixture 351.

As previously noted, the switch mechanism SM100A comprises one hundred primary contact sets PC111 to PC100, inclusive; the first ten primary contact sets PC111 to PC110 being associated with the first primary bar PB101. Actually, the first ten primary contact sets PC111 to PC110, inclusive, comprises the first ten conductor sets 211, etc., disposed adjacent to the top of the bare-wire bank 210 and ten spring sets 411, etc., associated with the primary bar PB101; the first spring set 411 cooperating with the first conductor set 211, as clearly indicated in Figs. 2 and 3. More particularly, each spring set 411, etc., comprises a positive line spring, a negative line spring and a control spring; thus, the primary contact set PC111 comprises the first conductor set 211 in the bare-wire bank 210 and the first spring set 411 in the first group of ten spring sets. In the first group of spring sets the individual springs are arranged in two sections including an outer spring and an inner spring disposed in staggered relation in order to prevent the individual springs from engaging each other; which spring sets are mounted upon insulating strips 412 secured to the supporting base 221 and positioned between the body portion 321 of the bracket 320 and the bare-wire bank 210 by an arrangement including a channel 413. The channel 413 retains the insulating strips 412 in clamped relation; whereby the inner ends of the individual springs in the spring sets 411, etc., are retained in place; the outer ends of the individual springs in the spring sets 411, etc., are disposed adjacent to, but out of contact with, the corresponding conductors in the conductor sets 211, etc. Finally, the intermediate portions of the individual springs in the spring sets 411, etc., are retained in position by an arrangement comprising a plurality of teeth 414 and a plurality of intervening notches 415 formed in the first primary bar PB101. As previously noted, the first primary bar PB101 is formed of insulating material; the notches 415 formed therein receive the individual springs in the outer section and the teeth 414 formed thereon engaged the individual springs in the inner section. Finally, the inner ends of the spring sets 411, etc., comprise terminals which are wired to the ten riser busses RB101 to RB100, inclusive.

As best shown in Fig. 5, an upstanding cable 416 is secured in place upon the channel 413 and disposed between the channel 413 and the primary bars PB101, etc., and also between the intermediate portions of the spring sets 411, etc., and the brackets 320, etc. This cable 416 accommodates the ten riser busses RB101 to RB100, inclusive, as well as the test bus TB100 which are utilized for purposes more fully explained hereinafter. As previously explained, the ten primary contact sets in each group are respectively connected to the riser busses RB101 to RB100, inclusive; and each secondary contact set is connected to a corresponding one of the riser busses RB101 to RB100, inclusive. For example, this is accomplished by connecting the ten spring sets in the first group, including the first spring set 411, respectively to the ten riser busses RB101 to RB100, inclusive, in the cable 416 and by connecting the first riser bus RB101 in the cable 416 to the first secondary contact set SC101.

Considering now the mode of operation of the first marker magnet MM101, it will be understood that when the winding 344 is energized the core 343 attracts the armature 345 causing it to rotate in the counterclockwise direction, as viewed in Fig. 2. When the armature 345 is thus operated, the arm 346 thereof, carrying the projections 349 and 350, is moved away from the heel-piece 342. The projections 350 acting against the bias of the switch springs 348 of the first secondary contact set SC101 actuate the first secondary contact set SC101; and the projection 349, engaging the arm 356, rotates the fixture 351 in the counterclockwise direction, as viewed in Fig. 5, about the pivot pin 337. More particularly, the arms 352 and 353 of the fixture 351 are rotated from the full position to the dotted position, illustrated in Fig. 5; whereby the operating lugs 354 and 355 respectively carried by the arms 352 and 353 are moved into cooperative relation with respect to the operating lugs 363, etc., carried by the arms 362, etc., of the first pair of fixtures 358 and 359 supported upon the primary operating element 310. Specifically, the fixture 351 is rotated in the counterclockwise direction, as viewed in Fig. 5, against the bias of the coil spring 357; whereby the fixture 351, and consequently the bracket 330 carrying the first primary bar PB101, are effectively clutched to the primary operating element 310. At this time, in the event the primary magnet PM111 is operated, the primary operating element 310 is rotated in the counterclockwise direction, as viewed in Fig. 5, against the bias of the set of switch springs 306; all in the manner previously explained. When the primary operating element 310 is thus operated, the first pair of fixtures 358 and 359 cooperates with the first fixture 351; and specifically, the operating lugs 363, etc., engage the operating lugs 354 and 355 respectively carried by the arms 352 and 353 on the fixture 351. At this time only the first marking magnet MM101 occupies its operated position; whereby only the first fixture 351 is operated. Accordingly, operation of the primary operating element 310 is effective to operate only the first bracket 330 connected to the first primary bar PB101. More particularly, the lugs 363, etc., carried by the first pair of fixtures 358 and 359, supported by the primary operating element 310, engage the lugs 354 and 355 respectively carried by the arms 352 and 353 on the first fixture 351; whereby the first fixture 351, and consequently the first bracket 330, are moved toward the rear, as viewed in Fig. 5, forcing the first primary bar PB101 toward the bare-wire bank 210 against the bias of the first ten spring sets 411, etc. More particularly, the individual springs in the first ten spring sets are urged by the first primary bar PB101 into engagement with the first ten conductor sets 211, etc., in the bare-wire bank 210; whereby the first ten primary contact sets PC111 to PC110, inclusive, are effectively actuated. Thus, at this time, the first ten primary contact sets PC111 to PC110, inclusive, are actuated concurrently with actuation of the first secondary contact sets SC101. Hence, while the ten subscriber lines terminated by the first ten conductor sets 211, etc. are respectively connected to the ten riser busses RB101 to RB100, inclusive, only the first riser bus RB101 is connected to the test bus TB100.

Subsequently, when the winding 344 of the first marker magnet MM101 is deenergized, the core 343 releases the armature 345; whereby the arm 346 is rotated in the clockwise direction, as viewed in Fig. 2, and returned to its normal position by virtue of the resiliency of the switch springs 348 of the first secondary contact set SC101; whereby the first secondary contact set SC101 is returned to its normal position. Also, the projection 349 carried by the arm 346 disengages the arm 356 carried by the fixture 351; however, the fixture 351 is retained in its operated position while the primary operating element 310 is maintained operated. Subsequently, when the primary magnet PM111 is released, the primary operating element 310 is rotated in the clockwise direction, as viewed in Fig. 5, back into its home position by the resiliency of the set of switch springs 306, as previously explained; whereby the operating lugs 363, etc., carried by the first pair of fixtures 358 and 359 disengage the operating lugs 354 and 355 respectively carried on the arms 352 and 353 of the fixture 351. At this time, the resiliency of the first ten spring sets 411, etc., force the first primary bar PB101 toward the front and away from the bare-wire bank 210; whereby the first ten spring sets 411, etc., are returned to their normal positions. Also, when the fixtures 358 and 359 disengage the fixture 351, the coil spring 357 rotates the fixture 351 in the clockwise direction, as viewed in Fig. 5, back into its normal position. Finally, the first primary bar PB101 urges the bracket 330 towards the front and away from the bare-wire bank 210 back into its home position; whereby the front upper link 341 and the front lower link, not shown, respectively engage the stops 328 and 329 respectively carried by the arms 325 and 327 respectively carried by the flanges 323 and 324 of the bracket 320. At this time, the ten primary contact sets PC111 to PC110, inclusive, as well as the first secondary contact set SC101, occupy their open-circuit positions.

In view of the foregoing description of the mode of operation of the first marking magnet MM101 in conjunction with the primary magnet PM111 to bring about the operation of the first ten primary contact sets PC111 to PC110, inclusive, and the first secondary contact set SC101; it will be understood that the second marking magnet MM102 is operative in conjunction with the primary magnet PM111 in a similar manner to bring about operation of the second ten primary contact sets PC121 to PC120, inclusive, and the second secondary contact sets SC102, etc. In passing it is noted that the marker switch 120 of the switch mechanism SM100A is operative step by step in order to select sequentially the marking magnets MM101, MM102, etc., in a manner more fully explained in conjunction with the electric circuit diagram.

In the operation of the switch mechanism SM100A it will be understood that the marking magnets MM101, MM102, etc., are operated and restored in sequence until the marking magnet finally operated corresponds to the desired group of subscriber lines, at which time the primary magnet PM111 is energized in order to operate the primary operating element 310, causing the primary bar corresponding to the desired group of subscriber lines to be operated in the manner described above; the primary bar mentioned being effectively clutched to the primary operating element 310 at this time by virtue of the position of the finally operated marking magnet mentioned. Thereafter the marking magnets mentioned are further operated and restored in sequence, in the event this is necessary, until the marking magnet finally reoperated corresponds to the desired subscriber line in the previously selected group of subscriber lines; at which time further reoperation of the marking magnets is arrested. Accordingly, at this time, the desired subscriber line in the desired group of subscriber lines is connected by way of the corresponding riser bus to the test bus, since the corresponding secondary contact set is operated incident to the reoperation of the finally reoperated marking magnet mentioned.

Since the individual subscriber lines in the desired ten-line group are respectively connected to the ten riser busses, and the riser bus to which the desired subscriber line is connected is, in turn, connected to the test bus, a connection may be completed to the desired subscriber line in the desired group of lines by connecting the test bus to the associated trunk terminating the switch mechanism SM100A; all as explained in greater detail with reference to the electric circuit diagrams.

*Operation of the finder 600 in conjunction with the control circuit 1000 and the allotter 1100*

When one or more of the finder-selector links in the second group are idle, ground potential is applied to the links-busy conductor C1109, thereby to maintain operated the links-busy relay R1150 in the allotter 1100. For example, when the first finder-selector link illustrated is idle, the test relay R640 in the finder 600 occupies its restored position, completing, at the contacts 646, an obvious path for applying ground potential to the links-busy conductor C1109. The operated links-busy relay R1150 in the allotter 1100 maintains operated the reset relay R1145 and one of the link relays R1130, R1120, etc., corresponding to the idle link in the second group that is assigned at this time. Assuming that the first link mentioned is idle at this time and that the allotter 1100 is operated to select this link to handle the next call originating at a calling subscriber substation in the second 100 line group in the system, the link relay R1130 in the allotter 1100 occupies its operated position. More particularly, a series circuit is completed extending from ground by way of the contacts R1152 of the operated links-busy relay R1150, the winding of the reset relay R1145, the winding of the fault relay R1140, the contacts 1142, 1126 and 1135 of the operated link relay R1130 and the lower winding of R1130 to battery; whereby the reset relay R1145 and the link relay R1130 are maintained operated. However, the fault relay R1140 is not operated since the latter relay is of the marginal type. The operated link relay R1130 corresponding to the first link mentioned prepares, at the contacts 1131, a path traced hereinafter for applying ground potential to the link start conductor C1101 extending to the start relay R630 in the finder 600; and prepares, at the contacts 1134, a circuit traced hereinafter, including the guard conductor C1102 extending into the selector 700, for energizing the upper winding of the link relay R1120 in series with the upper winding of the link disconnect relay R1160; the link relay R1120 corresponding to one of the intermediate links in the second group. Finally, it is noted that the link relay R1110 corresponds to the last link in the second group. Accordingly, at this time, the allotter 1100 is operated to select the first link, comprising the finder 600 and the selector 700, to handle the next call originating at one of the calling subscriber substations in the second 100 line group in the system.

Now assuming that a call is initiated at the subscriber substation T611, included in the second 100 group, a circuit is completed including the line conductors C691 and C692 of the subscriber line 690 extending thereto and the contacts 661 and 662 for energizing in series the left-hand and right-hand windings of the line relay R655 in the line circuit 650 individual to the subscriber line 690. When thus energized, the line relay R655 operates to interrupt, at the contacts 657, multiple circuits for applying battery potential to the control conductor C693 of the subscriber line 690; and to complete, at the contacts 656, an obvious path for applying ground potential to the control conductor C693; thereby to mark the subscriber line 690 as busy to the connectors 800, etc., in the second group having access thereto. The normally completed multiple paths mentioned for applying battery potential to the control conductor C693 of the subscriber line 690 include the winding of the cutoff relay R660 and the contacts 663 and the resistor 665 in the line circuit 650. Also, the line relay R655 completes, at the contacts 658, multiple paths substantially identical to those previously traced for applying battery potential to the control conductor C694 of the subscriber line 690, thereby to mark the position of the primary contact set PC611 terminating the subscriber line 690 in the switch mechanism SM600 incorporated in the finder 600. Finally, the line relay R655 completes, at the contacts 659, an obvious path for applying ground potential to the first group start conductor C1002 extending into the control circuit 1000, thereby to initiate operation of the control circuit 1000 and the allotter 1100 and to mark the group of primary contact sets including the primary contact set PC611 terminating the subscriber line 690 in the switch mechanism SM600 incorporated in the finder 600.

More particularly, the application of ground potential to the first group start conductor C1002, common to the first group of ten subscriber lines, including the subscriber line 690, marks the group position of the subscriber line 690 to the control circuit 1000, as previously noted; and also completes a circuit, including the resistor 1025, for operating the start relay R1175 in the allotter 1100. Upon operating the start relay R1175 completes, at the contacts 1176, a circuit, including the contacts 1186 and 1151, for energizing the lower winding of the link start relay R1180, thereby to cause the latter relay to operate. Upon operating the link start relay R1180 completes, at the contacts 1181, a holding circuit, including the contacts 1171 and 1176, for energizing the lower winding thereof; and completes, at the contacts 1183, a multiple holding circuit for energizing in series the winding of the reset relay R1145, the lower winding of the fault relay R1140 and the lower winding of the link relay R1130, thereby to maintain operated the reset relay R1145 and the link relay R1130 incident to restoration of the links-busy relay R1150 in the special event that the first link mentioned is the last idle link in the second group. Further, the link start relay R1180 completes, at the contacts 1184, a circuit, including the contacts 1188, for operating the timer relay R1195; whereby the latter relay sets into vibration its armature RA1196. Finally, the link start relay R1180 completes, at the contacts 1182, a path, including the contacts 1161 and the contacts 1131 of the operated link relay R1130, for applying ground potential to the first link start conductor C1101; whereby the start relay R630 in the finder 600 is operated. Operation of the start relay R630 in the finder 600 is effective to initiate operation thereof in conjunction with operation of the control circuit 1000 in a manner more fully explained hereinafter in order to cause the switch mechanism SM600 to be operated promptly to find the subscriber line 690 extending to the calling subscriber substation T611 in the ordinary case; whereupon the cut-through relay R1170 in the allotter is operated in order to prevent a timing operation therein.

However, assuming that for some reason the finder 600 does not operate promptly to find the subscriber line 690 extending to the calling subscriber substation T611, a timing operation is brought about in the allotter 1100; whereby another idle link in the second group is assigned to find the subscriber line 690 extending to the calling subscriber substation T611 and the first link illustrated is released. More particularly, the vibrating armature RA1196 closes, at the contacts 1198 and 1199, a circuit, including the contacts 1184, for operating the timer relay R1190 shortly thereafter, the latter relay being of the slow-to-operate type. Upon operating, the timer relay R1190 prepares, at the contacts 1194, an alternative circuit, including the contacts 1197 and the contacts 1184, for energizing the winding thereof; which circuit is completed each time the vibrating armature RA1196 closes the contacts 1197. Also, upon operating the timer relay R1190 completes, at the contacts 1192, a circuit, including the contacts 1184, for operating the control relay R1185. Upon operating the control relay R1185 interrupts, at the contacts 1188, the previously traced circuit for maintaining operated the timer relay R1195, thereby to cause the latter relay to restore; whereby the armature RA1196 is again vibrated. The armature RA1196 vibrates for a considerable time interval maintaining operated the timer relay R1190; however, after a predetermined time interval the armature RA1196 settles down; whereby the contacts 1197 and 1198 are no longer completed alternately in order to effect restoration of the timer relay R1190. Upon restoring the timer relay R1190 interrupts, at the contacts 1192, the previously mentioned circuit for maintaining operated the control relay R1185; however, the latter relay does not restore immediately since it is of the slow-to-release type. Also, upon restoring the timer relay R1190 completes, at the contacts 1193, a circuit, including the contacts 1184, 1187, 1154, 1133, 1114, 1134 and 1155, for energizing the upper winding of the link relay R1120 in series with the upper winding of the link disconnect relay R1160, thereby to cause the latter relays to operate. Upon operating the link disconnect relay R1160 interrupts, at the contacts 1161, the previously traced path for applying ground potential to the first link start conductor C1101 extending to the first link illustrated in order to effect restoration of the start relay R630 in the finder 600 and the consequent release of the first link. Further, the link disconnect relay R1160 completes, at the contacts 1163, a holding circuit, including the contacts 1174, 1187, 1193 and 1184, for energizing the lower winding thereof. Upon operating the link relay R1120 interrupts, at the contacts 1126, the previously traced series holding circuit for energizing the lower winding of the link relay R1130 and the lower winding of the fault relay R1140 and the winding of the reset relay R1145, thereby to cause the link relay R1130 to restore immediately; the reset relay R1145 does not restore immediately, since it is of the slow-to-release type. Also, the link relay R1120, upon operating, completes, at the contacts 1125, a holding circuit, including the contacts 1116, 1142 and 1152, for energizing the lower winding thereof in series with the lower winding of the fault relay R1140 and the winding of the reset relay R1145; whereby the link relay R1120 and the reset relay R1145 are maintained in their operated positions. Further, the link relay R1120 prepares, at the contacts 1121, a path for applying ground potential to the link start conductor C1103 extending to the finder of the associated intermediate link. When the control relay R1185 restores, it interrupts, at the contacts 1187, the previously traced holding circuit for energizing the lower winding of the link disconnect relay R1160, thereby to cause the latter relay to restore at this time, since the previously traced circuit for energizing the upper winding of the link disconnect relay R1160 in series with the upper winding of the link relay R1120 was interrupted, at the contacts 1134, of the link relay R1130 incident to restoration thereof. Upon restoring the link disconnect relay R1160 completes, at the contacts 1161, a path including the contacts 1182 and 1121 of the operated link relay R1120 for applying ground potential to the link start conductor C1103 extending to the finder of the intermediate link; whereby operation of the finder of the intermediate link proceeds. More specifically, the finder of the intermediate link mentioned cooperates with the control circuit 1000 to hunt for the subscriber line 690 extending to the calling subscriber substation T611 in a manner identical to that of the finder 600 of the first link illustrated described below.

Now assuming, that the finder 600 of the first link operates promptly to find the subscriber line 690 extending to the calling subscriber substation T611 and before operation of the timing apparatus in the allotter 1100 in the manner described above; upon operating the start relay R630 in the finder 600 completes, at the contacts 630, a path for applying ground potential to the hunt conductor C1108; whereby a circuit, including the contacts 1191 and 1023, is completed for operating the start relay R1010 in the control circuit 1000, when the timer relay R1190 in the allotter 1100 closes the contacts 1191. Upon operating the start relay R1010 completes, at the contacts 1011, a path, including the contacts 1021 and 1031, for applying ground potential to the pulse conductor C1005, thereby to complete a circuit, including the contacts 635 of the operated start relay R630 in the finder 600, for energizing the magnet M623 of the marker switch 620. When the magnet M623 is thus energized, it operates immediately to drive the wiper 621 of the marker switch 620 one step in the clockwise direction away from its home position into engagement with the first contact in the associated contact bank. Also, upon operating, the magnet M623 completes, at the contacts 625, a path, including the contacts 635 and 634 of the operated start relay R630, for connecting the grounded pulse conductor C1005 to the interrupter conductor C1004. This application of ground potential to the interrupter conductor C1004 completes an obvious circuit for energizing the upper winding of the step relay R1030 in the control circuit 1000, thereby to cause the latter relay to operate. Upon operating the step relay R1030 completes, at the contacts 1034, a holding circuit, including the contacts 1048, 1053 and 1013, for energizing the lower winding thereof. Also, upon operating, the start relay R630 in the finder 600 completes, at the contacts 637, a circuit for energizing the left-hand winding of the test relay R640, thereby to render the latter relay exceedingly fast to operate when the right-hand winding thereof is subsequently energized. When the wiper 621 of the marker switch 620 engages the first contact in the associated contact bank, a circuit, including the contacts 636 of the operated start relay R630, is completed for energizing the first marking magnet MM601; thereby to cause the first marking magnet MM601 to operate and to clutch the first primary bar PB601 to the primary operating element associated with the primary magnet PM611 and to operate the first secondary contact set SC601. When the first secondary contact set SC601 is thus operated, the test bus TB600 is connected to the first riser bus RB601 for a purpose more fully explained hereinafter.

Also, when the step relay R1030 in the control circuit 1000 operates, it interrupts, at the contacts 1031, the previously mentioned path for applying ground potential to the pulse conductor C1005, thereby to interrupt a multiple circuit for energizing the magnet M623 of the marker switch 620 in the finder 600 and the upper winding of the step relay R1030; whereby the magnet M623 restores and the step relay R1030 is maintained in its operated position due to the completed holding circuit for energizing the lower winding thereof. When the wiper noted of the marker switch 620 is driven from its home position, the set of switch springs S626 is actuated for a purpose more fully explained hereinafter. Also, when the step relay R1030 in the control circuit 1000 operated, it completed, at the contacts 1032, a path, including the contacts 1013, 1043 and 1041 and the associated resistor, for energizing the upper winding of the transfer relay R1050, thereby to cause the latter relay to operate since the lower winding of the transfer relay R1050 was energized incident to operation of the start relay R1010. The transfer relay R1050 is of the polarized type and after the lower winding thereof was energized via the circuit completed, at the contacts 1013 of the operated start relay R1010, it operates exceedingly fast when the upper winding thereof is subsequently energized via the circuit completed, at the contacts 1032 of the operated step relay R1030. Upon operating the transfer relay R1050 interrupts, at the contacts 1053, the previously traced holding circuit for energizing the lower winding of the step relay R1030, thereby to cause the latter relay to restore, since the previously traced circuit for energizing the upper winding thereof was interrupted, at the contacts 625, incident to restoration of the magnet M623 of the marker switch 620 in the finder 600.

Also incident to operation of the start relay R1010 there is completed, at the contacts 1013, a circuit, including the contacts 1046 and 1061, for operating the first counting relay R1065. Upon operating the first counting relay R1065 completes, at the contacts 1080, a circuit, including the contacts 1013 and the contacts 1089 and 1093, arranged in multiple, for operating the reset relay R1060. Also, the first counting relay R1065 completes, at the contacts 1068, an alternative holding circuit including the contacts 1072, 1077, 1082, 1087 and 1013 for energizing the winding thereof. Upon operating the reset relay R1060 interrupts, at the contacts 1061, the previously traced original circuit for energizing the winding of the first counting relay R1065; and completes, at the contacts 1062, a holding circuit, including the multiple contacts 1089 and 1093, as well as the contacts 1013, for energizing the winding thereof.

Further, the first counting relay R1065 completes, at the contacts 1066', a connection including the contacts 1095 between the lower winding of the stop relay R1020 and the first group start conductor C1002; whereby the stop relay R1020 tests to determine whether the calling subscriber line is included in the first group of ten subscriber lines accessible to the finder 600. In the present example, the subscriber line 690 extending to the calling subscriber substation T611 is included in the first group of ten subscriber lines accessible to the finder 600; whereby ground potential appearing upon the first group start conductor C1002 completes a circuit for energizing the lower winding of the stop relay R1020 in order to cause the latter relay to operate. Upon operating the stop relay R1020 interrupts, at the contacts 1023, the previously traced circuit for maintaining operated the start relay R1010, thereby to cause the latter relay to restore shortly thereafter, it being of the slow-to-release type. Also, the stop relay R1020 completes, at the contacts 1024, a holding circuit, including the contacts 1191 and the grounded hunt conductor C1108, for energizing the upper winding thereof. Further, the stop relay R1020 interrupts, at the contacts 1021, a further point in the previously traced path for applying ground potential to the pulse conductor C1005, thereby positively to prevent further operation of the magnet M623 of the marker switch 620. Finally, the stop relay R1020 prepares, at the contacts 1022, a path, including the contacts 1031, for applying ground potential to the primary magnet conductor C1003; which path is completed, at the contacts 1012, incident to the restoration of the start relay R1010. The application of ground potential to the magnet conductor C1003 completes a circuit, including the contacts 631, for operating the primary magnet PM611 in the finder 600. Also, upon restoring, the start relay R1010 interrupts, at the contacts 1013, the previously traced multiple circuits for energizing the upper and lower windings of the transfer relay R1050, thereby to cause the latter relay to restore; and interrupts, at the contacts 1013, the previously traced multiple holding circuits for maintaining operated the reset relay R1060 and the first counting relay R1065 in order to cause the latter relays to restore.

When the primary magnet PM611 of the switch mechanism SM600 in the finder 600 is operated, the first primary bar PB601 clutched to the primary operating element by the operated first marking magnet MM601 is operated; whereby the first group of ten primary contact sets PC611, PC612, etc., and PC610 are operated to connect the subscriber lines in the first group of ten to the ten riser busses RB601, RB602, etc., and RB600, respectively. Also, at this time the first secondary contact set SC601 is operated by the operated first marking magnet MM601, thereby to connect the first riser bus RB601 directly to the test bus TB600. Accordingly, in the event the calling subscriber line is connected to the first riser bus RB601, a circuit is immediately completed for energizing the right-hand winding of the test relay R640; which, of course, is the present case, since the subscriber line 690 is connected via the first primary contact set PC611 in the first group of ten to the first riser bus RB601. When the right-hand winding of the test relay R640 is thus energized, it operates exceedingly fast to interrupt, at the contacts 641, a point in a circuit that would have been completed for effecting reoperation of the magnet M623 of the marker switch 620. More particularly, when the primary magnet PM611 operated to operate the ten primary contact sets PC611, etc., it ultimately prepared, at the contacts 612, at the end of its operating stroke, a circuit including the contacts 641, 633 and 624, for operating the magnet M623 of the marker switch 620; which circuit would have been completed had it not been for the operation of the test relay R640 exceedingly fast, in the present example, to interrupt, at the contacts 641, the circuit above-traced. Accordingly, in the present example, since the calling subscriber line 690 is terminated in the first primary contact set PC611 in the first group of ten, it is not necessary to reoperate the marker switch 620 beyond the position wherein the wiper 621 thereof engages the first contact in the associated contact bank.

Further, the test relay R640 completes, at the contacts 642, an obvious path for short-circuiting the right-hand winding thereof; whereby direct ground potential, at the contacts 636, is applied via the control conductor of the test bus TB600 to the control conductor of the first riser bus RB601, and consequently to the control conductor C694 of the subscriber line 690 having battery potential thereon marking the subscriber line 690 as the calling subscriber line, as previously explained. The application of direct ground potential to the control conductor C694 of the subscriber line 690 completes a circuit including the contacts 658 for operating the cut-off relay R660 in the line circuit 650 individual to the subscriber line 690. Upon operating, the cut-off relay R660 interrupts, at the contacts 663, the previously mentioned path for applying battery potential by way of the resistor 665 to the control conductor C694 of the subscriber line 690; and completes, at the contacts 664, a holding circuit for energizing the winding thereof from the grounded control conductor C694 of the subscriber line 690. Further, the cut-off relay R660 interrupts, at the contacts 661 and 662, the previously traced loop circuit extending between the calling subscriber substation T611 and the left-hand and right-hand windings of the line relay R655, thereby to cause the latter relay to restore. Upon restoring the line relay R655 completes, at the contacts 657, a path, including the contacts 664, between the control conductors C693 and C694 of the subscriber line 690, thereby to continue the marking of the subscriber line 690 as busy to the connectors 800, etc., in the second group having access thereto. Further, upon restoring the line relay R655 interrupts, at the contacts 659, the previously mentioned path for applying ground potential to the first group start conductor C1002, thereby to interrupt the previously traced circuit for maintaining operated the start relay R1175 in the allotter 1100 and for energizing the lower winding of the stop relay R1020 in the control circuit 1000. Further, the test relay R640 in the finder 600 completes, at the contacts 643, a path including the contacts 639 for applying ground potential to the cut-through conductor C1107, thereby to complete obvious multiple circuits for energizing the winding of the cut-through relay R1170 and the upper winding of the link start relay R1180 in the allotter 1100; whereby the cut-through relay R1170 operates and the link start relay R1180 is maintained operated, notwithstanding the restoration of the start relay R1175 as previously noted. Further, the test relay R640 completes, at the contacts 648, an obvious holding circuit for maintaining operated the primary magnet PM611 subsequent to the release of the start relay R630; and completes, at the contacts 647, an obvious holding circuit for maintaining operated the first marking magnet MM601 subsequent to the release of the start relay R630; and completes, at the contacts 644, an obvious circuit for operating the connect relay R625. Upon operating the connect relay R625 completes, at its associated contacts, an obvious connection between the test bus TB600 and the trunk 730; in order to complete a loop circuit extending from the calling subscriber substation T611 to the upper and lower windings of the line relay R750 in the selector 700; whereby the line relay R750 operates. Further, the test relay R640 in the finder 600 completes, at the contacts 645, a path, including the contacts 637, for applying ground potential to the control conductor C733 of the trunk 730, thereby to complete a circuit for energizing the lower winding of the test relay R740 in the selector 700 in order to render the latter relay exceedingly fast to operate when the upper winding thereof is subsequently energized, since the test relay R740 is of the polarized type. Finally, the test relay R640 in the finder 600 interrupts, at the contacts 646, one of the multiple paths for applying ground potential to the links-busy conductor C1109 extending to the links-busy relay R1150 in the allotter 1100 for the purpose previously explained.

Upon operating the line relay R750 in the selector 700 completes, at the contacts 752, an obvious circuit for operating the hold relay R760. Upon operating the hold relay R760 completes, at the contacts 765, a path for applying ground potential by way of the upper winding of the test relay R740 to the control conductor of the test bus TB700; and completes, at the contacts 766, a multiple path for applying ground potential to the control conductor C733 of the trunk 730, thereby to maintain operated the test relay R640 in the finder 600 subsequent to restoration of the start relay R630 therein. Finally, the hold relay R760 completes, at the contacts 767, a path for applying ground potential to the first guard conductor C1102 extending into the allotter 1100, thereby to complete a circuit, including the contacts 1134 and 1155, for energizing in series the upper winding of the link relay R1120 and the upper winding of the link disconnect relay R1160; whereby the relays mentioned operate. Upon operating the link relay R1120 effects restoration of the link relay R1130 in the manner previously explained; whereby ground potential is removed at the contacts 1131 from the first link start conductor C1101 extending to the finder 600 in order to cause the start relay R630 therein to restore. Upon restoring the start relay R630 interrupts, at the contacts 631, 634, 635, 639 and 630, the connections between the finder 600 and the control circuit 1000 and the allotter 1100. At this time, the primary magnet PM611, the first marking magnet MM601 and the connect relay R625 are retained in their operated positions by virtue of the completed holding circuits therefor maintained by the operated test relay R640. Accordingly, at this time, the finder 600 has operated to find the subscriber line 690 extending to the calling subscriber substation T611 and to connect the subscriber line 690 to the trunk 730 extending to the selector 700; whereupon the selector 700 is conditioned to be responsive to the first digit dialed at the calling subscriber substation 690 to the trunk 730 extending to the selector 700; whereupon the selector 700 is conditioned to be responsive to the first digit dialed at the calling subscriber substation T611 in a manner more fully explained hereinafter.

Upon operating the cut-through relay R1170 in the allotter 1100 interrupts, at the contacts 1171, the holding circuit for energizing the lower winding of the link start relay R1180, thereby to cause the latter relay to restore, since the start relay R630 in the finder 600 has, by this time, restored to interrupt, at the contacts 639, the previously traced multiple circuit for energizing the winding of the cut-through relay R1170 and the upper winding of the link start relay R1180. Also, upon operating the cut-through relay R1170 completes, at the contacts 1172, an obvious path for short-circuiting the lower winding of the fault relay R1140, thereby positively to prevent the operation of the latter relay incident to operation of the link relay R1120 and prior to restoration of the link relay R1130. Finally, the cut-through relay R1170 completes, at the contacts 1173, a holding circuit including the contacts 1163 for energizing the lower winding of the link disconnect relay R1160. Shortly thereafter the cut-through relay R1170 restores since it is of the slow-to-release type, interrupting, at the contacts 1172, the previously mentioned path for short-circuiting the lower winding of the fault relay R1140; and interrupting, at the contacts 1173, the holding circuit for energizing the lower winding of the link disconnect relay R1160; whereby the latter relay restores, since it is assumed that, by this time, the link relay R1120 has completely operated effecting the restoration of the link relay R1130. Upon restoring the link start relay R1180 interrupts, at the contacts 1182, a further point in a path, including the contacts 1161 and 1121, for applying ground potential to the link start conductor C1103 extending to the intermediate link. Also, the link start relay R1180 interrupts, at the contacts 1184, the circuits for maintaining operated the timer relay R1190 and the control relay R1185, thereby to cause the latter relays to restore, the control relay R1185 being slow to release as previously noted. At this time the control circuit 1000 and the allotter 1100 are completely released and available for further use.

Now assuming that the call is initiated at the subscriber substation T602, included in the second 100 group, the line relay R675 in the line circuit 670, individual to the subscriber line 695, extending to the calling subscriber substation T602 operates; thereby to initiate operation of the control circuit 1000, the allotter 1100 and the finder 600 in a manner substantially identical to that previously described. However, in this case, since the calling subscriber line 695 terminates in the primary contact set PC602 in the switch mechanism SM600, considerable operation of the control circuit 1000 in conjunction with the switch mechanism SM600 proceeds before the calling subscriber line 695 is found, as the primary contact set PC602 is arranged in the tenth group of ten primary contact sets in the switch mechanism SM600.

More particularly, the first time the step relay R1030 in the control circuit 1000 operates, operation of the transfer relay R1050 is brought about as previously explained, while the first counting relay R1065 occupies its operated position. At this time, the previously traced circuit for energizing the lower winding of the stop relay R1020 is not completed, since the winding mentioned is connected at the contacts 1066′ to the first group start conductor C1002; whereas ground potential appears upon the tenth group start conductor C1001, since the calling subscriber line 695 appears in the tenth group of subscriber lines accessible to the switch mechanism SM600 as previously noted. Accordingly, when the magnet M623 of the marker switch 620 restores it interrupts, at the contacts 625, the previously traced path for connecting the pulse conductor C1005 to the interrupter conductor C1004, thereby to interrupt the previously traced circuit for energizing the upper winding of the step relay R1030; whereupon the latter relay restores, assuming that the transfer relay R1050 has operated to interrupt, at the contacts 1053, the previously traced holding circuit for energizing the lower winding of the step relay R1030. Upon restoring the step relay R1030 recompletes, at the contacts 1031, the previously traced path for applying ground potential to the pulse conductor C1005, thereby to bring about reoperation of the magnet M623 of the marker switch 620 in order to drive the wiper noted thereof an additional step in the clockwise direction. Also, upon operating the magnet M623 recompletes, at the contacts 625, the previously traced connection between the grounded pulse conductor C1005 and the interrupter conductor C1004; whereby the previously traced circuit for energizing the upper winding of the step relay R1030 is recompleted, causing the latter relay to reoperate.

The magnet M623 of the marker switch 620 in the finder 600 cooperates with the step relay R1030 in the control circuit 1000 in the manner described above; whereby the step relay R1030 operates and restores repeatedly; and the magnet M623 operates and restores repeatedly, thereby to drive the wiper noted of the marker switch 620 step by step in the clockwise direction. When the wiper 621 of the marker switch 620 disengages the first contact and engages the second contact in the associated contact bank, the previously traced circuit for maintaining operated the first marking magnet MM601 is interrupted and a substantially identical circuit is completed for operating the second marking magnet MM602; whereby the first marking magnet MM601 restores and the second marking magnet MM602 operates. Accordingly, as the marker switch 620 is driven step by step, the marking magnets MM601, MM602, etc., are operated and subsequently restore in sequence; whereby the corresponding primary bars PB601, PB602, etc., are effectively clutched and then declutched from the primary operating element; and the corresponding secondary contact sets SC601, SC602, etc., are operated and then restored. As the secondary contact sets SC601, SC602, etc., are operated and then restored, the riser busses RB601, RB602, etc., are connected and then disconnected from the test bus TB600.

Considering now the operation of the control circuit 1000 in greater detail, the first time the step relay R1030 is operated the transfer relay R1050 is operated as previously noted. The first time the step relay R1030 restores it completes, at the contacts 1033, a circuit including the contacts 1013 and 1051 for energizing the lower winding of the transfer relay R1040; whereby the latter relay operates. At this time the transfer relay R1050 is retained in its operated position by virtue of the fact that the lower winding thereof is energized by way of the previously traced circuit, including the contacts 1013. The next time the step relay R1030 operates it completes, at the contacts 1032, a circuit, including the contacts 1013, 1042 and 1044 for energizing the upper winding of the transfer relay R1050 in series with the upper winding of the transfer relay R1040; whereby the transfer relay R1050 is restored and the transfer relay R1040 is retained in its operated position. The transfer relay R1050 is restored since the upper winding thereof is now energized in series with the upper winding of the transfer relay R1040 in a direction opposite to that in which it was originally energized, the transfer relay R1050 being of the polarized type. The second time the step relay R1030 restores it interrupts, at the contacts 1032, the previously traced circuit for energizing in series the upper winding of the transfer relay R1050 and the upper winding of the transfer relay R1040; whereby the operated transfer relay R1040 restores, since the transfer relay R1050 occupies its restored position. It is noted that the transfer relay R1050 is not capable of operation when the lower winding thereof alone is energized, but that the lower winding of the transfer relay R1050 is capable of retaining it operated after it is once operated and prior to energization of the upper winding thereof in the reverse direction. In view of the foregoing description of the mode of operation of the step relay R1030 in conjunction with the transfer relays R1040 and R1050, it will be understood that the position sequence of the relays mentioned is as follows:

| Step Relay R1030 | Transfer Relay R1040 | Transfer Relay R1050 |
|---|---|---|
| 1st Operation | Restored | Operated. |
| 1st Restoration | Operated | Do. |
| 2nd Operation | do | Restored. |
| 2nd Restoration | Restored | Do. |
| 3rd Operation | do | Operated. |
| 3rd Restoration | Operated | Do. |
| 4th Operation | do | Restored. |
| 4th Restoration | Restored | Do. |
| 5th Operation | do | Operated. |
| 5th Restoration | Operated | Do. |
| 6th Operation | do | Restored. |
| 6th Restoration | Restored | Do. |
| 7th Operation | do | Operated. |
| 7th Restoration | Operated | Do. |
| 8th Operation | do | Restored. |
| 8th Restoration | Restored | Do. |
| 9th Operation | do | Operated. |
| 9th Restoration | Operated | Do. |
| 10th Operation | do | Restored |
| 10th Restoration | Restored | Do. |

The first time the transfer relay R1040 operates it completes, at the contacts 1044', a holding circuit, including the contacts 1013 and 1051, for energizing the lower winding thereof; which holding circuit is interrupted when the transfer relay R1050 restores to open the contacts 1051. However, at this time, the previously traced circuit for energizing the upper winding of the transfer relay R1040 in series with the upper winding of the transfer relay R1050 is completed until the step relay R1030 restores the second time, thereby bringing about restoration of both of the transfer relays R1040 and R1050 as explained above. Also, each time the transfer relay R1040 restores it reprepares, at the contacts 1041 and 1043, the previously traced original circuit for energizing the upper winding of the transfer relay R1050; whereby the latter relay is poled to operate the next time the step relay R1030 operates, thereby maintaining the schedule of operation and restoration of the transfer relays R1040 and R1050 as explained above. Also, it is noted that each time the step relay R1030 operates while both of the transfer relays R1040 and R1050 are restored, it completes, at the contacts 1034, the previously traced holding circuit including the contacts 1048 and 1053 for energizing the lower winding thereof; which circuit is later interrupted at the contacts 1053 when the transfer relay R1050 next operates. Also, each time the step relay R1030 operates when both the transfer relays R1040 and R1050 are operated, it completes at the contacts 1034, a holding circuit including the contacts 1047 and 1052 for energizing the lower winding thereof; which circuit is then interrupted at the contacts 1052 when the transfer relay R1050 is next restored.

The first time the transfer relay R1040 operates it completes, at the contacts 1045, a circuit including the contacts 1013 and 1067 for operating the second counting relay R1070. Upon operating the second counting relay R1070 completes, at the contacts 1073, a holding circuit, including the contacts 1077, 1082, 1087 and 1013, for energizing the winding thereof; and interrupts, at the contacts 1072, the previously traced holding circuit for maintaining operated the first counting relay R1065. The first time the transfer relay R1040 restores it completes, at the contacts 1046, a circuit including the contacts 1013 and 1071 for operating the third counting relay R1075. Upon operating the third counting relay R1075 completes, at the contacts 1078, a holding circuit, including the contacts 1082, 1087 and 1013, for energizing the winding thereof; and interrupts, at the contacts 1077, the previously traced holding circuit for maintaining operated the second counting relay R1070. The second time the transfer relay R1040 operates it completes, at the contacts 1045, a circuit including the contacts 1013 and 1076 for operating the fourth counting relay R1080. Upon operating the fourth counting relay R1080 completes, at the contacts 1083, a holding circuit, including the contacts 1087 and 1013, for energizing the winding thereof; and interrupts, at the contacts 1082, the previously traced holding circuit for maintaining operated the third counting relay R1075.

In view of the foregoing description of the mode of operation of the transfer relay R1040 in conjunction with the five counting relays R1065, R1070, R1075, R1080 and R1085, it will be understood that the counting relays mentioned are operated sequentially, the fifth counting relay R1085 being operated incident to the second restoration of the transfer relay R1040. Upon operating the fifth counting relay R1085 completes, at the contacts 1088, a holding circuit including the contacts 1066 and 1013 for energizing the winding thereof. Upon the third operation of the transfer relay R1040 there is completed, at the contacts 1045, a circuit, including the contacts 1013, 1086 and 1091 for operating the reflex relay R1090. Upon operating the reflex relay R1090 completes, at the contacts 1092, a holding circuit, including the contacts 1013, for energizing the winding thereof; and interrupts, at the contacts 1093, the previously traced holding circuit for maintaining operated the reset relay R1060, thereby to cause the latter relay to restore. Upon the third restoration of the transfer relay R1040 there is recompleted, at the contacts 1046, the previously traced circuit for operating the first counting relay R1065. Upon reoperating the first counting relay R1065 interrupts, at the contacts 1066, the previously traced holding circuit for maintaining operated the fifth counting relay R1085.

In view of the above description of the mode of operation of the five counting relays R1065, R1070, R1075, R1080 and R1085 in conjunction with the reflex relay R1090, it will be understood that the cycle of operation of these relays is as follows:

| Counting Relay Operated | Reflex Relay R1090 |
|---|---|
| R1065 | Restored. |
| R1070 | Do. |
| R1075 | Do. |
| R1080 | Do. |
| R1085 | Do. |
| R1085 | Operated. |
| R1065 | Do. |
| R1070 | Do. |
| R1075 | Do. |
| R1080 | Do. |

In the present example, when the fourth counting relay R1080 is reoperated in conjunction with the reflex relay R1090 following the tenth operation of the magnet M623 of the marker switch 620 in the finder 600, a direct circuit is completed at the contacts 1081′, and including the contacts 1094 of the operated reflex relay R1090, for energizing the lower winding of the stop relay R1020 in order to cause the latter relay to operate in a manner analogous to that previously explained. At this time the wiper noted of the marker switch 620 has been driven ten steps from its home position back into its home position; whereby the tenth marking magnet MM600 occupies its operated position. Accordingly, upon operating the stop relay R1020 effects operation of the primary magnet PM611 in the switch mechanism SM600 in the finder 600 in the manner previously explained. Upon operating the primary magnet PM611 operates the tenth primary bar PB600 clutched to the primary operating element by the operated tenth marking magnet MM600; whereby the tenth group of ten primary contact sets PC602, PC603, etc., and PC601 are operated. Also, the tenth marking magnet MM600 operates the tenth secondary contact set SC600 to connect the tenth riser bus RB600 to the test bus TB600. At this point it is noted that the tenth group of primary contact sets includes the primary contact set PC602 terminating the subscriber line 695 extending to the calling subscriber substation T602. Accordingly, at this time, the calling subscriber line 695 is connected to the first riser bus RB601; while the tenth riser bus RB600 is connected to the test bus TB600. Thus, the subscriber line terminated by the primary contact set PC601 and connected by the tenth secondary contact set SC600 to the test bus TB600 is tested at this time; and assuming that the subscriber line mentioned is not in a calling condition, further operation of the marker switch S620 is brought about. More particularly, upon operating the primary magnet PM611, at the conclusion of its stroke, completes, at the contacts 612, the previously traced alternative circuit, including the contacts 633, 641 and 624, for operating the magnet M623 of the marker switch 620; whereby the latter magnet drives the wiper of the marker switch 620 one step in the clockwise direction away from its home position. Also, upon operating, the magnet M623 interrupts, at the contacts 624, the above traced circuit for operating it; whereby the magnet M623 restores in order to recomplete, at the contact 624, its operating circuit. Accordingly, the magnet M623 operates buzzer-fashion in order to drive the wiper noted of the marker switch 620 step by step in the clockwise direction until the test relay R640 tests the calling subscriber line in the tenth group, in the present example. In this case, the subscriber line 695 extending to the calling subscriber substation T602 is terminated by the primary contact set PC602, which, at this time, is connected to the first riser bus RB601. Thus, when the wiper noted of the marker switch 620 is driven to reengage the first contact in the associated contact bank, the first marking magnet MM601 operates to operate the first secondary contact set SC601 in order to connect the first riser bus RB601 to the test bus TB600; whereby a test circuit is completed for energizing the right-hand winding of the test relay R640, thereby to cause the latter relay to operate exceedingly fast. Upon operating the test relay R640 interrupts, at the contacts 641, the circuit previously traced over which the magnet M623 is operated intermittently, thereby positively to arrest further operation thereof, and consequently of the marker switch 620. Also, the test relay R640 completes, at the contacts 644, the previously mentioned circuit for operating the connect relay R625; whereby the test bus TB600 is connected to the trunk 730. The remainder of the operation of the finder 600 in response to the operation of the test relay R640 is the same as that previously described in conjunction with the operation of the finder 600 to find the subscriber line 690 extending to the calling subscriber substation T611. Accordingly, at this time, the calling subscriber substation T602 is connected via the operated finder 600 to the selector 700 and the selector 700, is, again, conditioned to be responsive to the first digit dialed, as previously explained. Further, the release of the control circuit 1000 and the subsequent operation of the allotter 1100 to assign another idle link for use of the next calling subscriber line in the second 100 line group accessible to the finders of the associated links, is the same as that previously described.

In the prior description of the allotter 1100 it was noted that when the finder 600 of the link illustrated operated to find a calling line that the selector 700 was conditioned to be responsive to the first digit dialed; that the test relay R640 in the finder 600 interrupted, at the contacts 646, the application of ground potential in the first link to the links-busy conductor C1109; and completed, at the contacts 643, the application of ground potential in the first link illustrated to the cut-through conductor C1107; and that the hold relay R760 in the selector 700 of the link illustrated applied ground potential therein to the first guard conductor C1102. The application of ground potential to the first guard conductor C1102 brought about operation of the link relay R1120 corresponding to the intermediate link at a time while the link relay R1130 corresponding to the first link illustrated was operated; whereby both of the relays R1130 and R1120 are operated simultaneously. However, at this time, the application of ground potential to the cut-through conductor C1107 brought about operation of the cut-through relay R1170, and the consequent short-circuiting of the lower winding of the fault relay R1140; whereby the latter relay was not operated notwithstanding the transitory operation of both of the link relays R1130 and R1140. Upon operating the link relay R1120 brought about the restoration of the link relay R1130 and subsequently when the cut-through relay R1170 restored, the lower winding of the fault relay R1140 was, again, inserted into the series circuit for energizing the winding of the reset relay R1145 and the lower winding of the link relay R1120.

Should it happen, for some reason, that the link relay R1120 does not effect restoration of the link relay R1130, then the lower windings of both of the relays mentioned would be included in multiple in the series circuit for energizing the lower winding of the fault relay R1140 and the winding of the reset relay R1145 upon the restoration of the cut-through relay R1170. In this peculiar event, the lower winding of the fault relay R1140 is sufficiently energized to cause the latter relay to operate, since it is of the marginal type. Upon operating the fault relay R1140 completes, at the contacts 1141, a holding circuit, including the contacts 1146, for energizing the upper winding thereof; and interrupts, at the contacts 1142, the series circuit for energizing the winding of the reset relay R1145, the lower winding of the fault relay R1140 and the lower windings of the link relays R1120 and R1130; whereby the link relays mentioned and the reset relay R1145 restore, the reset relay R1145 being slightly slow-to-release. Upon restoring the reset relay R1145 interrupts, at the contacts 1146, the holding circuit for energizing the upper winding of the fault relay R1140, thereby to cause the latter relay to restore. Also, upon restoring the reset relay R1145 completes, at the contacts 1147, a circuit, including the contacts 1152 and 1155, for energizing the upper winding of the link relay R1130 in series with the upper winding of the link disconnect relay R1160, thereby to cause the relays mentioned to operate. Upon operating the link relay R1130 completes, at the contacts 1135, the previously traced holding circuit for energizing the lower winding thereof in series with the lower winding of the fault relay R1140 and the winding of the reset relay R1145; whereby the reset relay R1145 is reoperated; however, the fault relay R1140 is not reoperated, since it is of the marginal type and only one of the link relays R1130 is connected in the series circuit including the lower winding thereof. Also, at this time, upon operating the link relay R1130 completes, at the contacts 1134, a connection to the first guard conductor C1102 extending into the selector 700 of the first link illustrated and including the upper winding of the link relay R1120, the contacts 1155 and the upper winding of the link disconnect relay R1160. Accordingly, at this time, in the event the first link illustrated is busy, ground potential appearing upon the first guard conductor C1102 brings about operation of the link relay R1120, and the consequent restoration of the link relay R1130; whereby the intermediate link is assigned to the use of the next calling subscriber line in the second group accessible to the finders of the links in the second group.

Now assuming that when the link illustrated becomes attached to a calling subscriber line in the manner previously explained, it is the last available link in the associated second group. In this event, ground potential is completely removed from the links-busy conductor C1109 effecting restoration of the links-busy relay R1150 in the allotter 1100. Upon restoring the links-busy relay R1150 interrupts, at the contacts 1155, the circuit including the upper winding of the link disconnect relay R1160 and the various guard conductors C1102, C1104, C1106, etc., over which the link relays R1120, R1110 and R1130 are sequentially operated, when ground potential appears upon each of the guard conductors mentioned, since all of the links in the associated second group are busy. Further, the links-busy relay R1150 brings about the restoration of the reset relay R1145 by opening the contacts 1152. Also, the links-busy relay R1150 completes, at the contacts 1153, an alternative circuit, including the contacts 1188, for operating the timer relay R1195, thereby to initiate a timing operation of the timing apparatus in the allotter 1100 in the manner previously explained. Thereafter, when one of the links in the associated group becomes idle, ground potential in the finder thereof is replaced upon the links-busy conductor C1109 and ground potential in the selector thereof is removed from the associated guard conductor C1102, C1104, C1106 or others; whereby the links-busy relay R1150 reoperates. Upon reoperating the links-busy relay R1150 recompletes, at the contacts 1152, a circuit, including the contacts 1147 and 1155, for energizing the upper winding of the link relay R1130 in series with the upper winding of the link disconnect relay R1160, thereby to cause the relays mentioned to operate. Upon operating the link relay R1130 recompletes, at the contacts 1135, the previously traced holding circuit for energizing the lower winding thereof in series with the lower winding of the fault relay R1140 and the winding of the reset relay R1145; whereby the reset relay R1145 reoperates. At this time, further operation of the link relays R1120, R1110, etc., depends upon the presence of ground potential upon the associated guard conductors C1102, C1104, etc. Finally, one of the link relays R1130, R1120, etc., is retained operated corresponding to the idle one of the links in the associated second group; whereby the idle link mentioned is assigned to the use of the next calling subscriber line in the second group of subscriber lines accessible to the finders of the links mentioned.

*Operation of the selector 700*

Now, assuming that the finder 600 of the first link illustrated has operated to find any one of the calling subscriber lines such, for example, as the subscriber line 690 extending to the calling subscriber substation T611. The selector 700 is conditioned to be responsive to the first digit dialed by virtue of the operation of the line relay R750 and the hold relay R760 as previously explained. More particularly, at this time, a loop circuit is completed between the calling subscribed substation T611 and the line relay R750 in the selector 700; which loop circuit extends respectively from ground and battery potentials by way of the lower and upper windings of the line relay R750, the contacts 744 and 743, the line conductors C732 and C731 of the trunk 730, the contacts of the operated connect relay R625, the test bus TB600, the secondary contact set SC601, the first riser bus RB601, the primary contact set PC611 and the line conductors C692 and C691 of the subscriber line 690 to the calling subscriber substation T611. When the first digit is dialed at the calling subscriber substation T611, the above traced loop circuit is interrupted and then recompleted repeatedly; whereby the line relay R750 in the selector 700 follows. Each time the line relay R750 restores and then reoperates it completes and then interrupts, at the contacts 751, a circuit, including the contacts 764, for operating the digit relay R770 and a multiple circuit, including the contacts 782, for operating the magnet M723 of the marker switch 720; whereby the magnet M723 is operated and restored intermittently, thereby to drive the wiper noted of the marker switch 720 step by step in the clockwise direction away from its home position. The digit relay R770 operates and remains operated during the digit, as it is of the slow-to-release type. Likewise, the hold relay R760 remains operated during the digit since it is of the slow-to-release type. When the wiper noted of the marker switch 720 is driven away from its home position, the set of switch springs S726 is actuated for a purpose more fully explained hereinafter. Also, upon operating the digit relay R770 completes, at the contacts 773, a circuit, including the contacts 763 and 785, for energizing the lower winding of the control relay R780, thereby to cause the latter relay to operate through its first step to complete, at the contacts 783, a path, including the contacts 785 and 773, for short-circuiting the upper winding thereof; the control relay R780 being of the two-step type. At the conclusion of the digit the line relay R750 is maintained operated, thereby to retain operated the hold relay R760 and to prevent further operation of the magnet M723 of the marker switch 720. As the wiper 721 is driven step by step in the clockwise direction engaging the corresponding contacts in the associated contact bank, circuits, including the contacts 751′, are completed and then interrupted for operating sequentially the marking magnets MM701, MM702, etc.; whereby, at the conclusion of the digit, one of the marking magnets MM701, MM702, etc., occupies its operated position; the particular marking magnet operated corresponding to the number of impulses received in the digit.

By way of example, it is assumed that the first digit dialed at the calling subscriber substation T611 is the digit 2; whereby, at the conclusion of this digit, the corresponding second marking magnet MM702 in the switch mechanism SM700 occupies its operated position clutching the second primary bar PB702 to the associated primary operating element. Shortly following the conclusion of the digit 2, the digit relay R770 restores, as it is of the slow-to-release type, interrupting, at the contacts 773, the previously traced path for short-circuiting the upper winding of the control relay R780; whereupon a circuit, including the contacts 763, is completed for energizing in series the upper and lower windings of the control relay R780 in order to cause the latter relay to operate through its second step, or completely. Upon operating completely the control relay R780 completes, at the contacts 781, a circuit, including the contacts 771, for operating the primary magnet PM711; whereby the primary operating element is operated in order to effect operation of the second primary bar PB702 clutched thereto by the operated second marking magnet MM702. When the second primary bar PB702 is thus operated, the ten individual trunks in the second group, including the trunk 830, are respectively connected to the ten riser busses RB701 to RB700, inclusive, by the ten respectively associated primary contact sets PC720 to PC729, inclusive, that are operated at this time by the operated second primary bar PB702. Also, the operated second marking magnet MM702 connects the second riser bus RB702 to the test bus TB700; whereby ground potential, at the contacts 765, is applied by way of the upper winding of the test relay R740 to the control conductor of the test bus TB700 and thence by way of the operated second secondary contact set SC702 to the control conductor of the second riser bus RB702, and consequently by way of the operated primary contact set PC721 to the control conductor of the first trunk in the selected second group in order to test the idle or busy condition thereof. It will be appreciated that in the event the first trunk in the selected second group is idle at this time, battery potential appears upon the control conductor thereof completing an obvious circuit for energizing the upper winding of the test relay R740; whereas, in the event the trunk mentioned is busy, ground potential appears upon the control conductor thereof completing an obvious path for short-circuiting the upper winding of the test relay R740. Accordingly, the test relay R740 tests the idle or busy condition of the first trunk in the selected second group, operating in the event the first trunk mentioned is tested as idle and remaining restored in the event that the first trunk mentioned is tested as being busy. Assuming that the first trunk in the selected second group is tested as being busy by the test relay R740 at this time, the test relay R740 remains restored; whereby a circuit is completed, at the contacts 712, incident to the operation of the primary magnet PM711 in order to cause further operation of the magnet M723 of the marker switch 720. The circuit mentioned extends from ground by way of the contacts 745, 772, 712, 762 and 724 and the magnet M723 to battery. When thus energized the magnet M723 operates to drive the wiper noted of the marker switch 720 an additional step in the clockwise direction and to interrupt, at the contacts 724, the circuit for energizing the magnet M723 in order to cause the magnet M723 to restore. Upon restoring the magnet M723 recompletes, at the contacts 724, the above-traced circuit for operating itself; whereby the magnet M723 is operated buzzer-fashion until the test relay R740 operates to interrupt, at the contacts 745, the above traced circuit for operating the magnet M723.

When the wiper 721 of the marker switch 720 is driven into engagement with the next contact in the associated contact bank the second trunk in the previously selected second group of trunks is tested by the test relay R740, as previously explained; whereby the test relay R740 is operated in the event the trunk mentioned is tested as being idle, thereby to arrest further operation of the magnet M723, as previously noted. Assuming that the first eight trunks in the second group are tested by the test relay R740 as being busy, the magnet M723 then operates to drive the wipers noted of the marker switch 720 back into their home positions; whereupon the test relay R740 tests the idle or busy condition of the ninth trunk 830 in the selected second group. Assuming that the ninth trunk 830 in the selected second group is idle at this time, battery potential appears upon the control conductor C833 thereof; battery potential being applied thereto by way of the contacts 831 and the upper winding of the transfer relay R840 in the connector 800, individual to the trunk 830. At this time a series circuit is completed for energizing the upper winding of the transfer relay R840 and the upper winding of the test relay R740, thereby to cause the relays mentioned to operate; the latter relay operating exceedingly fast, since it is of the polarized type, interrupting, at the contacts 745, the previously traced circuit for operating intermittently the magnet M723 of the marker switch 720. Accordingly, operation of the marker switch 720 is arrested at this time while the tenth marking magnet MM700 occupies its operated position, operating the tenth secondary contact set SC700 in order to connect the tenth riser bus RB700 to the test bus TB700. Also, upon operating the test relay R740 completes, at the contacts 742, an obvious circuit for operating the connect relay R725; whereby the trunk 730 is connected to the test bus TB700 and thence by way of the operated tenth secondary contact set SC700 to the tenth riser bus RB700 and thence by way of the operated primary contact set PC729 to the ninth trunk 830 in the second group extending to the connector 800, individual thereto. Further, the test relay R740 completes, at the contacts 741, an obvious multiple holding circuit for maintaining operated the tenth marking magnet MM700; and completes, at the contacts 740, an obvious multiple holding circuit for maintaining operated the primary magnet PM711; and completes, at the contacts 747, an obvious multiple path for applying ground potential to the first guard conductor C1102 extending into the allotter 1100. Further, the test relay R740 interrupts, at the contacts 746, the original path for applying battery potential by way of the resistor 749 to the control conductor C733 of the trunk 730; ground potential being applied to the control conductor C733 at this time at the contacts 766 of the operated hold relay R760. Finally, the test relay R740 interrupts, at the contacts 743 and 744, the previously traced loop circuit extending from the calling subscriber substation T611 to the upper and lower windings of the line relay R750, thereby to cause the latter relay to restore, effecting the restoration of the hold relay R760 shortly thereafter, the hold relay R760 being of the slow-to-release type. Upon restoring the hold relay R760 prepares, at the contacts 761, an alternative circuit, including the contacts 724 and 741′ and the set of switch springs S726, for operating the magnet M723 of the marker switch 720; which circuit will not be completed subsequently, in the present example, by virtue of the fact that the wiper noted of the marker switch 720 happens to engage the home contact in the associated contact bank actuating the set of switch springs S726 into open-circuit relation. Further, the hold relay R760 interrupts, at the contacts 763, the previously traced circuit for energizing in series the upper and lower windings of the control relay R780, thereby to cause the latter relay to restore; and interrupts, at the contacts 766, the previously mentioned path for applying ground potential in the selector 700 to the control conductor C733 of the trunk 730; however, at this time ground potential is applied to the control conductor C733 of the trunk 730 by virtue of the fact that the control conductor C833 of the trunk 830 is grounded in the connector 800, as explained more fully hereinafter. Finally, the hold relay R760 interrupts, at the contacts 767, the previously mentioned original path for applying ground potential to the first guard conductor C1102 extending into the allotter 1100. Upon restoring the control relay R780 interrupts, at the contacts 781, the previously traced original circuit for operating the primary magnet PM711; however, the primary magnet PM711 is maintained operated at this time due to the holding circuit therefor completed by the operated test relay R740. Also, the operated test relay R740 maintains operated the tenth marking magnet MM700 and the connect relay R725. Finally, the test relay R740 is maintained in its operated position by virtue of the fact that the lower winding thereof is energized in a circuit including the grounded control conductor C733 of the trunk 730.

When the selector 700 is operated in the manner described above to select the ninth trunk 830 in the second group extending to the connector 800, a loop circuit is completed for energizing the upper and lower windings of the line relay R820 in the connector 800. This loop circuit extends from battery and ground potentials by way of the upper and lower windings of the line relay R820 and the contacts 813 and 815 to the line conductors C831 and C832 of the trunk 830; and therefrom by way of the tenth riser bus RB700 and the test bus TB700 in the switch mechanism SM700 in the selector 700 to the line conductors C731 and C732 of the trunk 730; and therefrom by way of the test bus TB600 and the first riser bus RB601 in the switch mechanism SM600 in the finder 600 to the line conductors C691 and C692 of the subscriber line 690 to the calling subscriber substation T611. When this loop circuit is completed, the line relay R820 in the connector 800 operates. Also, incident to the operation of the selector 700 to select the trunk 830 ground potential at the contacts 765 of the operated hold relay R760 was applied by way of the upper winding of the test relay R740 and the control conductor of the tenth riser bus RB700 to the control conductor C833 of the trunk 830. This application of ground potential to the control conductor C833 of the trunk 830 completed a circuit, including the contacts 831, for energizing the upper winding of the transfer relay R840 in the connector 800, thereby to cause the latter relay to operate as previously noted. Upon operating the transfer relay R840 prepares, at the contacts 844 a circuit traced hereinafter for energizing the winding of the hold relay R830; which circuit is completed, at the contacts 821, incident to the operation of the line relay R820. The circuit mentioned extends from the grounded control conductor C833 of the trunk 830 by way of the contacts 831, 832, 844 and 821 and the winding of R830 to battery. When thus energized the hold relay R830 operates to complete, at the contacts 836, a holding circuit, including the contacts 821, for energizing the winding thereof. Also, the hold relay R830 interrupts, at the contacts 831, the previously traced circuit for energizing the upper winding of the transfer relay R840; however, the latter relay does not immediately restore, as it is of the slow-to-release type. Further, the hold relay R830 completes, at the contacts 832, an obvious path for applying ground potential to the control conductor C833, thereby to maintain operated the selector 700, the finder 600 and the cut-off relay R660 in the line circuit 650 individual to the subscriber line 690 extending to the calling subscriber substation T611. Further, the hold relay R830 completes, at the contacts 836, an alternative holding circuit, including the contacts 844 and 892, for energizing the upper winding of the transfer relay R840, thereby to retain the latter relay in its operated position. Further, the hold relay R830 completes, at the contacts 836, a circuit, including the contacts 821, 841 and 894, for energizing the lower winding of the control relay R890, thereby to cause the latter relay to operate through its first step to complete, at the contacts 893′, a path, including the contacts 836, 821, 841, 894, 874 and 837, for short-circuiting the upper winding thereof; the control relay R890 being of the two-step type. At this time the connector 800 has been seized and is in readiness to receive the next digit dialed at the calling subscriber substation T611.

Reconsidering the operation of the selector 700 in response to the reception of the first digit 2 dialed at the calling subscriber substation T611, it is again noted that at the conclusion of the second digit 2, operation of the marker switch 720 is initiated and reoperates with the test relay R740 to find an idle trunk in the selected second group as previously described. However, it may occur that all of the trunks in the second group are busy at this time, in which case operation of the marker switch 720 continues by virtue of the failure of the test relay R740 to operate in response to the testing as idle of a trunk in this group. As the marker switch 720 continues to operate, the marking magnets MM701, MM702, etc., are operated sequentially and then restored in a cyclic manner; whereby the marker switch 720 causes the test relay R740 to test the trunks in the selected second group a plurality of times; and in the event any one of these trunks is tested as idle, operation of the test relay R740 occurs in the manner previously explained. This operation permits the selector 700 to find a trunk in the selected second group that has become idle between cyclic operations of the marker switch 720. However, in the event all of the trunks in the selected second group persist as busy, the next digit dialed at the calling subscriber substation T611 is received by the line relay R750 in the selector 700 instead of by the line relay R820 in the connector 800, since the selector 700 has not switched through to select an idle trunk in the selected second group. In this peculiar event the line relay R750 again follows the second digit dialed at the calling subscriber substation T611 to bring about operation of the digit relay R770 subsequent to complete operation of the control relay R780. When the digit relay R770 operates at this time there is completed, at the contacts 774, a path, including the contacts 785′ and the condenser 786, for connecting the busy tone conductor C787 to the line conductor C731 of the trunk 730; whereby busy tone current is returned over the loop circuit to the calling subscriber substation T611 in order to indicate to the subscriber thereat that he should release the present connection in view of the all-trunks-busy condition appearing in the switch train. Also, upon operating the digit relay R770 interrupts, at the contacts 771, the previously traced circuit for maintaining operated the primary magnet PM711; whereby the associated primary operating element is released permitting the release of the second primary bar PB702, and the consequent release of the selected second group of trunks by the selector 700. The subsequent release of the finder 600 and the selector 700 of the link illustrated in response to the performance of a release operation at the calling subscriber substation T611 is substantially identical to that explained more fully hereinafter.

*Operation of the connector 800*

Now assume that a call has been initiated at one of the subscriber substations in the second 100 group; that the finder 600 of the link illustrated has seized the calling line extending thereto; that the selector 700 of this link has seized the trunk 830 extending to the connector 800; and that the connector 800 has been prepared to respond to the next digit dialed at the calling subscriber substation; all in the manner previously explained. When the subscriber at the calling subscriber substation dials the next digit, the loop circuit extending to the line relay R820 in the connector 800 is interrupted intermittenly; whereby the line relay R820 follows. Each time the line relay R820 restores and then reoperates, it interrupts and then recompletes, at the contacts 821, the previously traced circuit for energizing the winding of the hold relay R830, thereby to retain the latter relay in its operated position during the digit, since it is of the slow-to-release type. Also, each time the line relay R820 restores and then reoperates it completes and then interrupts, at the contacts 822, a circuit, including the contacts 836, 834, and 842, for energizing the lower winding of the transfer relay R840; as well as a multiple circuit, including the contacts 836 and 834, for energizing the magnet M923 of the marker switch 920; whereby the wiper noted of the marker switch 920 is driven step by step in the clockwise direction away from its home position. Assuming that the present call is to be extended to the subscriber substation T602, the directory number of which is 202; the first digit dialed at the calling subscriber substation T611 was 2 which caused the selector 700 to operate in the manner previously explained to seize the connector 800; and the present second digit is 0. At the conclusion of the second digit 0 the wiper noted of the marker switch 920 has been driven ten steps in the clockwise direction away from its home position back into its home position; whereby the wiper noted of the marker switch 920 engages the tenth contact in the associated contact bank completing a circuit, including the contacts 837, for energizing the tenth marking magnet MM900 in order to cause the latter magnet to operate and clutch the tenth primary bar PB900 to the associated primary operating element. Also, the tenth marking magnet MM900 operates the tenth secondary contact set SC900 in order to connect the tenth riser bus RB900 to the test bus TB900 for a purpose more fully explained hereinafter. Also, when the wiper noted of the marker switch 920 is driven one step in the clockwise direction away from its home position, the set of switch springs S926 is actuated to close the associated contacts; and when the wiper noted is driven back into its home position, the set of switch springs S926 is again actuated to open the associated contacts.

Also, the first time the line relay R820 restores, it interrupts, at the contacts 821, the previously traced path for short-circuiting the upper winding of the control relay R890; whereby the latter relay is operated through its second step, or completely, over a circuit, including the contacts 837, 874 and 893', as well as the upper and lower windings thereof in series. Upon operating completely the control relay R890 interrupts, at the contacts 892, the previously traced circuit for energizing the upper winding of the transfer relay R840. Accordingly, at the conclusion of the second digit 0, when the line relay R820 is maintained in its operated position there is interrupted, at the contacts 822, the previously traced circuit for energizing the lower winding of the transfer relay R840; whereby shortly thereafter the latter relay restores, it being of the slow-to-release type. Upon restoring, the transfer relay R840 completes, at the contacts 846, a circuit, including the contacts 898, for energizing the primary magnet PM911; whereby the associated primary operating element is operated to effect operation of the ten primary contact sets in the tenth group PC901, PC902, etc., and PC900; thereby to connect the ten subscriber lines, including the subscriber line 695 extending to the called subscriber substation T602, to the respective ten riser busses RB901, RB902, etc., and RB900. In the present example the subscriber line 695 extending to the called subscriber substation T602 is connected by the operated primary contact sets PC902 to the second riser bus RB902.

The subscriber at the calling subscriber substation then proceeds to dial the third digit 2; whereby the line relay R820 follows. Each time the line relay R820 restores and then reoperates it interrupts and then recompletes, at the contacts 821, the previously traced circuit for maintaining operated the hold relay R830. Since the latter relay is of the slow-to-release type, it is maintained operated during impulsing. Also, each time the line relay R820 restores and then reoperates it completes and then interrupts, at the contacts 822, the previously traced circuit for energizing the magnet M923 of the marker switch 920 and a multiple circuit, including the contacts 836, 834, 843 and 895, for energizing the winding of the busy relay R860. Accordingly, the busy relay R860 operates and being of the slow-to-release type remains operated during the third digit 2. Further, the magnet M923 of the marker switch 920 is operated and restored two additional times in accordance with the two impulses of the third digit 2; whereby the wiper noted of the marker switch 920 engages the second contact in the associated contact bank. When the wiper noted of the marker switch 920 is again driven away from its home position, the set of switch springs S926 is actuated. Upon operating the busy relay R860 completes, at the contacts 862, a circuit, including the contacts 893, for operating the control relay R870; and interrupts, at the contacts 863, a point in a circuit traced hereinafter for energizing the lower winding of the test relay R880. Also, the busy relay R860 completes, at the contacts 864, a multiple circuit, including the contacts 837 and 893', for energizing in series the upper and lower windings of the control relay R890, thereby to prevent the latter relay from restoring when the control relay R870 operates to interrupt, at the contacts 874, the previously traced original circuit for energizing in series the upper and lower windings of the control relay R890.

At the conclusion of the third digit 2, the wiper noted of the marker switch 920 engages the second contact in the associated contact bank, thereby to complete a circuit, including the contacts 837, for energizing the second marking magnet MM902; whereby the latter magnet operates to operate the second secondary contact set SC902 in order to connect the second riser bus RB902 to the test bus TB900. Also, at the conclusion of the third digit 2, the line relay R820 is maintained in its operated position, thereby positively to prevent further operation of the marking magnets MM901, etc., and to cause the busy relay R860 to restore shortly thereafter, since the latter relay is of the slow-to-release type. Upon restoring the busy relay R860 interrupts, at the contacts 862, the previously traced circuit for maintaining operated the control relay R870; however, the latter relay does not restore immediately, since it is of the slow-to-release type. Also, the busy relay R860 interrupts, at the contacts 864, the previously traced alternative circuit for energizing in series the upper and lower windings of the control relay R890, thereby to cause the latter relay to restore. Finally, upon restoring the busy relay R860 completes, at the contacts 863, a path for applying ground potential by way of the lower winding of the test relay R880 and the contacts 872 to the control conductor of the test bus TB900 and by way of the operated second secondary contact set SC902 to the control conductor of the second riser bus RB902 and by way of the operated primary contact set PC911 to the control conductor C698 of the subscriber line 695 extending to the called subscriber substation T602. Further operation of the connector 800 depends upon the idle or busy condition of the called subscriber substation T602.

First assuming that the called subscriber substation T602 is busy at this time, ground potential appearing upon the control conductor C698 of the associated subscriber line 695 completes a path substantially identical to that previously traced for short circuiting the lower winding of the test relay R880 in the connector 800, thereby to prevent operation thereof. Shortly thereafter, the control relay R870 restores completing, at the contacts 871, an alternative circuit, including the contacts 836, 845, 885 and 896, for reoperating the busy relay R860. Upon reoperating the busy relay R860 interrupts, at the contacts 863, the previously traced test circuit including the lower winding of the test relay R880; and completes, at the contacts 861, a path, including the condenser 816, the contacts 853, 891 and the condenser 865, for connecting the busy tone conductor C866 to the line conductor C831 of the trunk 830; whereby busy tone current is returned over the trunk 830, the selector 700, the trunk 730 and the finder 600 and the calling subscriber line to the calling subscriber substation, thereby to indicate to the subscriber thereat that the present connection cannot be completed due to the busy condition of the called subscriber substation T602. The subscriber at the calling subscriber substation then proceeds to release the operated finder 600, the selector 700 and the connector 800 in a manner more fully explained hereinafter.

Now assuming that the called subscriber substation T602 is idle at this time, battery potential appearing upon the control conductor C698 of the associated subscriber line 695 completes a circuit substantially identical to that previously traced for energizing the lower winding of the test relay R880 in the connector 800; whereby the latter relay operates shortly thereafter, it being of the slow-to-operate type; and completes, at the contacts 883, a holding circuit, including the contacts 833, for energizing the upper winding thereof; and completes, at the contacts 886, an obvious circuit for operating the connect relay R925. Upon operating the connect relay R925 completes, at its associated contacts, an obvious connection between the trunk 930 and the test bus TB900. Further, the test relay R880 completes, at the contacts 887, a holding circuit, including the contacts 846, for maintaining operated the primary magnet PM911; and completes, at the contacts 881, a path including the condenser 816, the contacts 853, and the condenser 857' for connecting the ring-back tone conductor C858 to the line conductor C831 of the trunk 830 in order to cause ring-back tone current to be returned over the trunk 830, the selector 700, the trunk 730, the finder 600 and the calling subscriber line 690 to the calling subscriber substation T611, thereby to indicate to the subscriber thereat that the called subscriber substation T602 is being rung. Further, the test relay completes, at the contacts 884, a path, including the contacts 872, for applying direct ground potential to the control conductor of the test bus TB900, and consequently to the control conductor of the second riser bus RB902 and thence to the control conductor C698 of the called subscriber line 695. This application of direct ground potential to the control conductor C698 of the calling subscriber line 695 completes a circuit, including the contacts 677, for operating the cutoff relay R680 in the line circuit 670 individual to the called subscriber line 695. Upon operating the cutoff relay R680 interrupts, at the contacts 681 and 682, the normal connections between the left-hand and right-hand windings of the line relay R675 and the line conductors C696 and C697 of the subscriber line 695; and interrupts, at the contacts 683, the previously traced path for applying battery potential by way of the associated resistor 685 to the control conductor C698 of the subscriber line 695. Further, the cutoff relay R680 completes, at the contacts 684, a connection, including the contacts 677, between the control conductors C698 and C699 of the subscriber line 695; whereby the subscriber line 695 is marked as busy both to the other connectors 800, etc., in the second group having access thereto and to the finders 600, etc., in the second group having access thereto. When the connect relay R925 is operated direct ground potential on the control conductor C933 of the trunk 930 is connected to the control conductor of the test bus TB900 and thence to the control conductor of the second riser bus RB902, and consequently to the control conductor C698 of the subscriber line 695, thereby to maintain operated the cutoff relay R680 in the line circuit 670 individual to the called subscriber line 695. Also, the lower winding of the ring cutoff relay R850, the battery 848 and the generator 847 are connected in series across the line conductors C931 and C932 of the trunk 930, and thence by way of the contacts of the operated connect relay R925, the line conductors of the test bus TB900, the operated second secondary contact set SC902, the line conductors of the second riser bus RB902 and the operated primary contact set PC902 to the line conductors C696 and C697 of the called subscriber line 695; whereby the ringer at the called subscriber substation T602 is operated.

Shortly after the test relay R880 operates the control relay R870 restores to interrupt, at the contacts 872, the previously traced original path for applying ground potential to the control conductor of the test bus TB900; which operation is without effect since the control conductor of the test bus TB900 is now connected to the grounded control conductor C933 of the trunk 930 by virtue of the operated position of the connect relay R925. Further, the control relay R870 interrupts, at the contacts 873, the previously traced original circuit for operating the primary magnet PM911; which operation is without effect, since the previously traced holding circuit for maintaining operated the primary magnet PM911 is completed by the operated test relay R880. At this time the operated test relay R880 maintains operated the connect relay R925 and the primary magnet PM911; and the operated hold relay R830 maintains operated the second marking magnet MM902.

The path for projecting ringing current over the called subscriber line 695 extends from the line conductors C931 and C932 of the trunk 930 by way of the contacts 851 and 854 to the generator 847, the battery 848 and the lower winding of the ring cutoff relay R850 arranged in series relation; and from the line conductors C931 and C932 of the trunk 930 by way of the previously traced path including the line conductors of the test bus TB900 and the line conductors of the second riser bus RB902 to the line conductors C696 and C697 of the called subscriber line 695.

When the subscriber at the called subscriber substation T602 answers the call by removing the receiver of the telephone instrument thereat from his associated switchhook, a low resistance circuit substantially identical to that previously traced is completed for energizing the lower winding of the ring cutoff relay R850, thereby to cause the latter relay to operate shortly thereafter, it being of the combination slow-to-operate and slow-to-release type. Upon operating the ring cutoff relay R850 completes, at the contacts 857, a holding circuit, including the contacts 833, for energizing the upper winding thereof; and interrupts, at the contacts 851 and 854, the previously traced path for projecting ringing current over the called subscriber line 695. Also, the ring cutoff relay R850 interrupts, at the contacts 853, the previously traced path for returning ring back tone current over the calling subscriber line; and completes, at the contacts 852 and 855, an obvious connection between the upper and lower windings of the answer relay R810 and the line conductors C931 and C932 of the trunk 930; whereby the upper and lower windings of the answer relay R810 are energized over a loop circuit including the trunk 930 and the connected called subscriber line 695 extending to the called subscriber substation T602. When thus energized the answer relay R810 operates to reverse, at the contacts 812, 813, 814 and 815, the polarity of the line relay R820 with respect to the trunk 830; which reversal of polarity over the trunk 830, and consequently over the selector 700, the trunk 730, the finder 600 and the line conductors of the calling subscriber line may be employed for metering purposes in a conventional manner. Also, upon operating the answer relay R810 completes, at the contacts 811, multiple holding circuits, including the contacts 856 and 882, for energizing the upper windings of the ring cutoff relay R850 and the test relay R880. At this time, a loop circuit is completed between the calling subscriber substation and the line relay R820 in the connector 800; and a loop circuit is completed between the called subscriber substation T602 and the answer relay R820 in the connector 800. Finally, the line conductors C831 and C832 of the trunk 830 are operatively connected by the condensers 816 and 817 to the line conductors C931 and C932 of the trunk 930; whereby the loop circuit extending to the calling subscriber substation is connected to the loop circuit extending to the called subscriber substation T602 for conversational purposes.

*Release of the established connection*

For the purpose of illustration it may be assumed that the subscriber substation T611 is the calling subscriber substation; that the subscriber substation T602 is the called subscriber substation; and the established connection therebetween includes the finder 600, the selector 700 and the connector 800; all in the manner previously explained. At the conclusion of the connection when the subscriber at the called subscriber substation T602 replaces the receiver of the telephone instrument thereat upon its associated switchhook, the previously traced loop circuit extending therefrom to the answer relay R810 in the connector 800 is interrupted, thereby to cause the latter relay to restore. Upon restoring the answer relay R810 interrupts, at the contacts 811, the previously mentioned multiple holding circuits for maintaining operated the ring cutoff relay R850 and the test relay R880; and again reverses, at the contacts 812, 813, 814 and 815, the polarity of the line relay R820 with respect to the line conductors of the trunk 830; which reversal of polarity over the trunk 830, and consequently the subscriber line 690 extending to the calling subscriber substation T611, may be employed for metering purposes in a conventional manner. Subsequently, when the subscriber at the calling subscriber substation T611 replaces the receiver of the telephone instrument thereat upon its associated switchhook, the previously traced circuit extending to the line relay R820 in the connector 800 is interrupted, thereby to cause the latter relay to restore. Upon restoring the line relay R820 interrupts, at the contacts 821, the previously traced circuit for maintaining operated the hold relay R830, thereby to cause the latter relay to restore shortly thereafter, it being of the slow-to-release type. Upon restoring the hold relay R830 interrupts, at the contacts 832, the previously mentioned path for applying ground potential to the control conductor C833 of the trunk 830; and interrupts, at the contacts 833, the previously traced multiple holding circuits for energizing the upper windings of the ring cutoff relay R850 and the test relay R880; whereby the test relay R880 restores immediately and the ring cutoff relay R850 restores shortly thereafter, it being of the combination slow-to-operate and slow-to-release type. Also, upon restoring the hold relay R830 interrupts, at the contacts 837, the previously traced circuit for maintaining operated the second marking magnet MM902, thereby to cause the latter magnet to restore and release the second secondary contact set SC902 in order to disconnect the test bus TB900 from the second riser bus RB902. Upon restoring the test relay R880 interrupts, at the contacts 886, the previously mentioned circuit for maintaining operated the connect relay R925; whereby the latter relay restores to disconnect the trunk 930 from the test bus TB900. Further, the test relay R880 interrupts, at the contacts 887, the previously mentioned circuit for maintaining operated the primary magnet PM911; whereby the latter magnet restores to effect the complete release of the switch mechanism SM900. Finally, the test relay R880 completes, at the contacts 888, the previously mentioned circuit, including the contacts 835 and 924 and the set of switch springs S926, for operating the magnet M923 of the marker switch 920. Upon operating the magnet M923 drives the wiper noted of the marker switch 920 an additional step in the clockwise direction and interrupts, at the contacts 924, the above traced operating circuit therefor. Thus, the magnet M923 operates buzzer-fashion to drive the wiper noted of the marker switch 920 step by step in the clockwise direction back into its home position; whereupon the set of switch springs S926 is actuated in order to interrupt the circuit for operating intermittently the magnet M923. At this time, ground potential in the connector 800 is removed from the control conductor C698 of the called subscriber line 695 in order to effect the restoration of the cutoff relay R680 in the line circuit 670 individual to the subscriber line 695. Upon restoring the cutoff relay R680 recompletes, at the contacts 681 and 682, the connections between the right-hand and left-hand windings of the line relay R675 and the line conductors C696 and C697 of the subscriber line 695. Also, the cutoff relay R680 interrupts, at the contacts 684, the previously traced connection between the control conductors C698 and C699 of the subscriber line 695; whereby no potential appears upon the control conductor C699 and battery potential by way of the winding of the cutoff relay R680 and by way of the resistor 685 is applied to the control conductor C698. The removal of potential from the control conductor of the subscriber line 695 marks the subscriber line 695 as neither calling nor busy to the finders 600, etc., in the second group having access thereto; while the application of battery potential to the control conductor C698 of the subscriber line 695 marks the subscriber line 695 as idle to the connectors 800, etc., in the second group having access thereto.

At this time the connector 800 is completely released and available for further use; and when ground potential is removed from the control conductor C833 of the trunk 830, ground potential is removed from the control conductor C733 of the trunk 730, and consequently from the control conductor C694 of the subscriber line 690 extending to the calling subscriber substation T611. When ground potential is removed from the control conductor C694 of the subscriber line 690, the circuit for maintaining operated the cutoff relay R660 in the line circuit 650 individual to the subscriber line 690 is interrupted, thereby to cause the latter relay to restore. Upon restoring the cutoff relay R660 recompletes, at the contacts 661 and 662, the connections between the left-hand and right-hand windings of the line relay R655 and the line conductors C691 and C692 of the subscriber line 690. Also, the cutoff relay R660 interrupts, at the contacts 664, the previously traced connection between the control conductors C693 and C694 of the subscriber line 690; whereby no potential appears upon the control conductor C694 and battery potential is applied by way of the winding of the cutoff relay R660 and by way of the resistor 665 to the control conductor C693 of the subscriber line 690. The application of no potential to the control conductor C694 of the subscriber line 690 marks the subscriber line 690 neither as a calling line nor as a busy line to the finders 600, etc., in the second group having access thereto; whereas the application of battery potential to the control conductor C693 of the subscriber line 690 marks the subscriber line 690 as idle to the connectors 800, etc., in the second group having access thereto.

When ground potential is removed from the control conductor C733 of the trunk 730, the previously traced holding circuit for energizing the lower winding of the test relay R740 in the selector 700 is interrupted, thereby to cause the latter relay to restore. Upon restoring the test relay R740 interrupts, at the contacts 742, the previously mentioned circuit for maintaining operated the connect relay R725; whereby the latter relay restores to disconnect the trunk 730 from the test bus TB700. Also, upon restoring the test relay R740 interrupts, at the contacts 740, the previously mentioned holding circuit for maintaining operated the primary magnet PM711; and interrupts, at the contacts 741, the previously mentioned circuit for maintaining operated the tenth marking magnet MM700; whereby the switch mechanism SM700 in the selector 700 is completely released. Also, upon restoring the test relay R740 recompletes, at the contacts 743 and 744, the normal connections between the upper and lower windings of the line relay R750 and the line conductors C731 and C732 of the trunk 730; and completes, at the contacts 746, the previously traced path for applying battery potential by way of the resistor 749 to the control conductor C733 of the trunk 730. Further, the test relay R740 interrupts, at the contacts 747, the previously mentioned path for applying ground potential to the first guard conductor C1102 extending into the allotter 1100, thereby to mark the link illustrated in the second group as available for further use to the allotter 1100. Finally, the test relay R740 prepares, at the contacts 741', a circuit, including the contacts 761 and 724 and the set of switch springs S726, for operating the magnet M723 of the marker switch 720; which circuit is not completed in the present example by virtue of the peculiar condition that the wiper noted of the marker switch 720 already occupies its home position, causing the set of switch springs S726 to be operated to open-circuit position.

Also, when ground potential is removed from the control conductor C733 of the trunk 730, the previously traced circuit for energizing the left-hand winding of the test relay R640 in the finder 600 is interrupted, thereby to cause the latter relay to restore. Upon restoring the test relay R640 interrupts, at the contacts 644, the previously mentioned circuit for maintaining operated the connect relay R625; whereby the latter relay restores to disconnect the trunk 730 from the test bus TB600. Also, the test relay R640 interrupts, at the contacts 647, the previously mentioned holding circuit for maintaining operated the first marking magnet MM601; and interrupts, at the contacts 648, the previously mentioned holding circuit for maintaining operated the primary magnet PM611; whereby the switch mechanism SM600 in the finder 600 is completely released. Further, the test relay R640 completes, at the contacts 641, a circuit, including the contacts 632 and 624 and the set of switch springs S626, for operating the magnet M623 of the marker switch 620. Upon operating the magnet M623 drives the wiper noted of the marker switch 620 an additional step in the clockwise direction; and interrupts, at the contacts 624, the circuit for operating the magnet M623; whereby the magnet M623 operates buzzer-fashion to drive the wiper noted of the marker switch 620 step by step in the clockwise direction back into its home position in order to operate the set of switch springs S626 into open-circuit position. Finally, the test relay R640 recompletes, at the contacts 646, the previously mentioned path for applying ground potential in the first link illustrated in the second group to the links-busy conductor C1109 in order to maintain operated the links-busy relay R1150 in the allotter 1100. At this time the finder 600 and the selector 700 are completely released; whereby the first link illustrated in the second group is available for further use when assigned again by the allotter 1100.

*Conclusions*

In view of the foregoing it is apparent that there has been provided an improved automatic telephone system comprising finders, selectors and connectors, each incorporating improved switching apparatus of the coordinate type.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising a plurality of groups of lines, a plurality of busses, a trunk, a plurality of members respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, said magnets being respectively provided with armatures selectively operative to select any one of said members and to operate any one of said contact sets, means for selecting any one of said magnets and for operating its armature to select the associated one of said members and to operate the associated one of said contact sets, means for operating said one member, and means controlled by the operation of said one member for connecting the individual lines in the associated one of said groups of lines respectively to said busses, the operation of said one contact set connecting the associated one of said busses to said trunk.

2. Switching apparatus comprising a plurality of groups of lines, a plurality of busses, a trunk, an element, a plurality of members commonly associated with said element and respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, said magnets being respectively provided with armatures selectively operative to select any one of said members and to operate any one of said contact sets, means for selecting any one of said magnets and for operating its armature to select the associated one of said members and to operate the associated one of said contact sets, means for operating said element in order to operate said one member, and means controlled by the operation of said one member for connecting the individual lines in the associated one of said groups of lines respectively to said busses, the operation of said one contact set connecting the associated one of said busses to said trunk.

3. Switching apparatus comprising a plurality of groups of lines, a plurality of busses, a trunk, a plurality of members respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, each of said magnets including an armature, first means for effecting operation of the armature of any given one of said magnets, means including the operated armature of said one magnet for operating the associated one of said members, means controlled by the operation of said one member for connecting the individual lines in the associated one of said groups of lines respectively to said busses, second means for effecting reoperation of the armature of any given one of said magnets, and means controlled by the reoperation of the armature of said one magnet for operating the associated one of said contact sets, the operation of said one contact set connecting the associated one of said busses to said trunk.

4. Switching apparatus comprising a plurality of groups of lines, a plurality of busses, a trunk, a plurality of members respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, each of said magnets including an armature, control means for effecting sequential operation and subsequent restoration of the armatures of said magnets, first means for governing said control means to effect final operation of the armatures of any given one of said magnets, means including the operated armature of said one magnet for operating the associated one of said members, means controlled by the operation of said one member for connecting the individual lines in the associated one of said groups of lines respectively to said busses, second means for governing said control means to effect final reoperation of the armature of any given one of said magnets, and means controlled by the reoperation of the armature of said one magnet for operating the associated one of said contact sets, the operation of said one contact set connecting the associated one of said busses to said trunk.

5. Switching apparatus comprising a plurality of groups of lines, a plurality of busses, a trunk, a plurality of members respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, each of said magnets including an armature, control means operative to effect cyclic operation and restoration of the armatures of said magnets, first means for initiating and then for arresting operation of said control means in order to effect final operation of the armature of any given one of said magnets, means including the operated armature of said one magnet for operating the associated one of said members, means controlled by the operation of said one member for connecting the individual lines in the associated one of said groups of lines respectively to said busses, second means for initiating and then for arresting continued operation of said control means in order to effect final reoperation of the armature of any given one of said magnets, and means controlled by the reoperation of the armature of said one magnet for operating the associated one of said contact sets, the operation of said one contact set connecting the associated one of said busses to said trunk.

6. Switching apparatus comprising a plurality of groups of lines, a plurality of busses, a trunk, a plurality of members respectively associated with said groups of lines, a plurality of contact sets respectively associated with said busses, a plurality of magnets respectively associated with said members and respectively associated with said contact sets so that any particular one of said magnets is commonly associated with a particular one of said members and with a particular one of said contact sets, each of said magnets including an armature operative to select the associated one of said members and to operate the associated one of said contact sets, a marker switch having access to said magnets, means for selectively operating said marker switch to select a first of said magnets and then to select a second of said magnets, means for operating the armature of said first magnet in order to select the corresponding one of said members, means for operating said selected one member, means controlled by the operation of said one member for connecting the individual lines in the corresponding one of said groups of lines respectively to said busses, and means for operating the armature of said second magnet in order to operate the corresponding one of said contact sets, the operation of said one contact set connecting the corresponding one of said busses to said trunk.

7. In a telephone system including a trunk and a plurality of groups of lines; a unitary switch comprising a plurality of busses respectively corresponding to the individual lines in each of said groups of lines, a plurality of members respectively associated with said groups of lines, a plurality of contact sets respectively associated with said busses, and a plurality of magnets respectively associated with said members and respectively associated with said contact sets so that any particular one of said magnets is commonly associated with a particular one of said members and with a particular one of said contact sets, each of said magnets including an armature operative to select the associated one of said members and to operate the associated one of said contact sets; means responsive to a call on one line in one of said groups of lines for operating the armatures of said magnets to select the one of said members associated with said one group of lines and to operate the one of said contact sets associated with the one of said busses corresponding to said one line in said one group of lines; means for operating said selected one member; and means controlled by the operation of said one member for connecting the individual lines in the associated one of said groups of lines respectively to said busses; the operation of said one contact set connecting said one bus to said trunk.

8. In a telephone system including a trunk and a plurality of groups of lines; a unitary switch comprising a plurality of busses respectively corresponding to the individual lines in each of said groups of lines, a plurality of members respectively associated with said groups of lines, a plurality of contact sets respectively associated with said busses, and a plurality of magnets respectively associated with said members and respectively associated with said contact sets so that any particular one of said magnets is commonly associated with a particular one of said members and with a particular one of said contact sets, each said magnets including an armature operative to select the associated one of said members and to operate the associated one of said contact sets; means responsive to a digit received over said trunk for operating the armature of a corresponding first of said magnets; means including the operated armature of said one magnet for operating the associated one of said members; means controlled by the operation of said one member for connecting the individual lines in the associated one of said groups of lines respectively to said busses; and means for operating the armature of a second of said magnets associated with one of said contact sets that is in turn associated with one of said busses to which an idle line in said one group of lines is connected in order to operate said one contact set; the operation of said one contact set connecting said one bus to said trunk.

9. In a telephone system including a trunk and a plurality of groups of lines; a unitary switch comprising a plurality of busses respectively corresponding to the individual lines in each of said groups of lines; a plurality of members respectively associated with said groups of lines, a plurality of contact sets respectively associated with said busses, and a plurality of magnets respectively associated with said members and respectively associated with said contact sets so that any particular one of said magnets is commonly associated with a particular one of said members and with a particular one of said contact sets, each of said magnets including an armature operative to select the associated one of said members and to operate the associated one of said contact sets; means responsive to a first digit received over said trunk for operating the armature of a corresponding first of said magnets; means including the operated armature of said one magnet for operating the associated one of said members; means controlled by the operation of said one member for connecting the individual lines in the associated one of said groups of lines respectively to said busses; and means responsive to a second digit received over said trunk for operating the armature of a corresponding second of said magnets in order to operate the associated one of said contact sets; the operation of said one contact set connecting the associated one of said busses to said trunk.

10. In a telephone system including a principal trunk and a plurality of groups of lines; switching apparatus comprising a test trunk, a plurality of busses, a plurality of members respectively associated with said groups of lines, a plurality of contact sets respectively associated with said busses, and a selecting device having access to said members and to said contact sets; means for selectively operating said selecting device to select any first of said members and to operate the corresponding first of said contact sets; means for operating said selected first member; means controlled by the operation of said first member for connecting the individual lines in the associated one of said groups of lines respectively to said busses; the operation of said first contact set connecting the associated one of said busses to said test trunk, so that one of the lines in said one group of lines is conneced via said one bus to said test trunk; a tester associated with said test trunk and operative to test any line connected thereto; and means controlled by said tester in the event said one line in said one group of lines connected to said test trunk is tested as having an idle condition thereon for connecting said test trunk to said principal trunk.

11. In a telephone system including a principal trunk and a plurality of groups of lines; switching apparatus comprising a test trunk, a plurality of busses, a plurality of members respectively associated with said groups of lines, a plurality of contact sets respectively associated with said busses, and a selecting device having access to said members and to said contact sets; means for selectively operating said selecting device to select any first of said members and to operate the corresponding first of said contact sets; means for operating said selected first member; means controlled by the operation of said first member for connecting the individual lines in the associated one of said groups of lines respectively to said busses; the operation of said first contact set connecting the associated one of said busses to said test trunk so that one of the lines in said one group of lines is connected via said one bus to said test trunk; a tester associated with said test trunk and operative to test any line connected thereto; means controlled by said tester in the event said one line in said one group of lines connected to said test trunk is tested as having a busy condition thereon for reoperating said selecting device to select a second of said members and to operate the corresponding second of said contact sets; the operation of said second contact set connecting the associated second of said busses to said test trunk so that another of the lines in said one group of lines is connected via said second bus to said test trunk; and additional means controlled by said tester in the event said another line in said one group of lines connected to said test trunk is tested as having an idle condition thereon for connecting said test trunk to said principal trunk.

12. In a telephone system including a principal trunk and a plurality of groups of lines; switching apparatus comprising a test trunk, a plurality of busses, a plurality of members respectively associated with said groups of lines, a plurality of contact sets respectively associated with said busses, and a selecting device having access to said members and to said contact sets; means responsive to a call on one line in one of said groups of lines for operating said selecting device to select a first of said members associated with said one group of lines and to operate the corresponding first of said contact sets; means for operating said selected first member; means controlled by the operation of said first member for connecting the individual lines in said one group of lines respectively to said busses; the operation of said first contact set connecting the associated one of said busses to said test trunk so that a given one of the lines in said one group of lines is connected via said one bus to said test trunk; a tester associated with said test trunk and operative to test any line connected thereto; and means controlled by said tester in the event said given one line in said one group of lines connected to said test trunk is tested as being said one calling line in said one group of lines for connecting said test trunk to said principal trunk.

13. In a telephone system including a principal trunk and a plurality of groups of lines; switching apparatus comprising a test trunk, a plurality of busses, a plurality of members respectively associated with said groups of lines, a plurality of contact sets respectively associated with said busses, and a selecting device having access to said members and to said contact sets; means responsive to a digit received over said principal trunk for operating said selecting device to select a corresponding first of said members and to operate the corresponding first of said contact sets; means for operating said selected first member; means controlled by the operation of said first member for connecting the individual lines in the associated one of said groups of lines respectively to said busses; the operation of said first contact set connecting the associated one of said busses to said test trunk so that one of the lines in said one group of lines is connected via said one bus to said test trunk; a tester associated with said test trunk and operative to test any line connected thereto; and means controlled by said tester in the event said one line in said one group of lines connected to said test trunk is tested as idle for connecting said test trunk to said principal trunk.

14. In a switching unit for use in an automatic telephone system of the crossbar or coordinate type, a plurality of contact actuators each carrying a plurality of contact-actuating members laterally projecting therefrom longitudinally thereof for coaction with associated movable contact springs, an operating member common to all said actuators, clutch means carried by each actuator, control means for selectively operating any one of said clutch means to couple any one actuator selectively with said common operating member, and an electromagnet having an armature for moving said common operating member responsive to energization thereof to move the actuator which has been coupled with such operating member for the purpose of operatively actuating the contact springs associated with the contact-actuating members of such actuator.

15. The structure and combination defined in claim 14, wherein said control means comprises a plurality of solenoids, there being one solenoid for individually operating the clutch means carried by each contact actuator.

16. In a switching unit for use in an automatic telephone system of the crossbar or coordinate type, sets of movable contacts arranged in a plurality of groups arranged side by side, an actuator for each group arranged alongside its corresponding group and having contact-actuating members laterally projecting therefrom longitudinally thereof for coaction with the corresponding movable contacts of said sets of contacts, operating means for said actuators whereby each actuator is caused to move for operatively actuating the movable sets of contacts in its group, clutch means for selectively coupling said actuators with said operating means, and a control device individual to said switching unit for selectively operating said clutch means to couple any one actuator selectively with said operating means.

17. The structure and combination defined in claim 16, wherein each actuator carries clutch means individual thereto, said control device comprising a plurality of solenoids one for individually actuating each clutch means.

18. In an automatic telephone system of the coordinate or crossbar type having a plurality of individual switching units arranged side by side, a trunk line individual to each switching unit comprising a plurality of conductors terminating therein, a plurality of sets of line bars extending through all of said switching units, tens and units actuators in each switching unit for connecting any one set of said line bars with said trunk conductors, individual control means in each switching unit for selecting said actuators for operation, and means for operatively actuating selected actuators to establish connection between a particular set of line bars and said trunk conductors.

19. In a switching mechanism for use in an automatic telephone system of the crossbar or coordinate type, a plurality of trunk units supported side by side on a suitable base, a plurality of sets of line bars extending through all said trunk units, a trunk line comprising a plurality of trunk conductors terminating in each trunk unit, individual tens and units selection control means for each trunk unit to determine the connection of a particular set of line bars with the trunk conductors terminating in the corresponding trunk unit, and connecting means in each trunk unit selectively operatively controlled by the individual selection control means thereof to effect such connection.

20. In an automatic telephone system of the class described, a plurality of individual switching units disposed side by side, a line bank multiple comprising a plurality of sets of conductor bars extending serially through all said switching units, a link comprising a plurality of conductors terminating in each switching unit, a plurality of tens and a plurality of units actuators in each switching unit, any two jointly actuated tens and units actuators being adapted to connect a particular set of conductor bars with said link conductors, and selection control means individual to each switching unit for determining the operative actuation of any pair of tens and units actuators.

21. In an automatic telephone system of the class described, a plurality of switching units disposed side by side, a line bank multiple comprising a plurality of sets of conductor bars arranged side by side in ten tens groups and extending serially through all said switching units, a link comprising a plurality of conductors terminating in each switching unit, a plurality of tens actuators individual to each switching unit, one for each tens group of said conductor bars, a plurality of units actuators individual to each switching unit, one for each units group of all said tens groups of said conductor bars, any two jointly actuated tens and units actuators being adapted to connect a particular set of conductor bars with said link conductors, and common selection control means individual to each switching unit for determining the operative actuation of any two tens and units actuators.

JOHN E. OSTLINE.

References Cited in the file of this patent

UNITED STATES PATENTS

| Number | Name | Date |
|---|---|---|
| 1,463,815 | Hinrichsen | Aug. 7, 1923 |
| 1,472,503 | Taylor | Oct. 30, 1923 |
| 1,515,735 | Goodrum et al. | Nov. 18, 1924 |
| 1,551,033 | Kerr | Aug. 25, 1925 |
| 1,563,658 | Richard | Dec. 1, 1925 |
| 1,565,637 | Goff | Dec. 15, 1925 |
| 2,027,463 | Bascom et al. | Jan. 14, 1936 |
| 2,350,458 | Hibbard | June 6, 1944 |